United States Patent
Brooks et al.

(10) Patent No.: US 6,557,021 B1
(45) Date of Patent: Apr. 29, 2003

(54) ROUNDING ANTICIPATOR FOR FLOATING POINT OPERATIONS

(75) Inventors: Jeffrey S. Brooks, Austin, TX (US); James S. Blomgren, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/527,653

(22) Filed: Mar. 17, 2000

Related U.S. Application Data

(60) Provisional application No. 60/163,652, filed on Nov. 4, 1999.

(51) Int. Cl.[7] .................................................. G06F 7/38
(52) U.S. Cl. ........................ 708/496; 708/551; 708/493
(58) Field of Search ................................ 708/497, 205, 708/505, 498, 209, 551, 552

(56) References Cited

U.S. PATENT DOCUMENTS

| | | | |
|---|---|---|---|
| 4,562,553 A | | 12/1985 | Mattedi et al. |
| 5,390,134 A | | 2/1995 | Heikes et al. |
| 5,550,768 A | | 8/1996 | Ogilvie et al. |
| 5,568,412 A | * | 10/1996 | Han et al. .................... 708/497 |
| 5,771,183 A | * | 6/1998 | Makineni .................... 708/205 |
| 5,957,997 A | * | 9/1999 | Olson et al. ................. 708/205 |
| 6,085,211 A | * | 7/2000 | Yoshioka .................... 708/205 |

* cited by examiner

Primary Examiner—Chuong Dinh Ngo
Assistant Examiner—Chat C. Do
(74) Attorney, Agent, or Firm—Booth & Wright, LLP; Matthew J. Booth; Karen S. Wright

(57) ABSTRACT

A method and apparatus that performs anticipatory rounding of intermediate results in a floating point arithmetic system while the intermediate results are being normalized is disclosed. One embodiment of the present invention includes four logic levels, implemented in N-NARY logic. In the first three logic levels, propagation information is gathered for preselected bit groups from the coarse and medium shift output of the normalizer as those results become available. In the fourth level, an incremented, normalized intermediate single-precision or double-precision mantissa result is produced by combining fine shift output bit values with propagation information for the appropriate top bit group, middle bit group, and bottom bit group. The appropriate bit groups are determined by examining the value of the fine shift select signal.

16 Claims, 34 Drawing Sheets

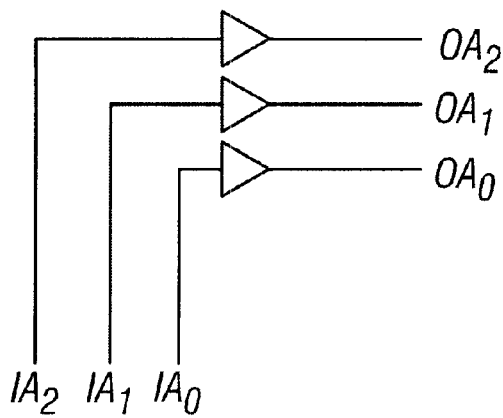
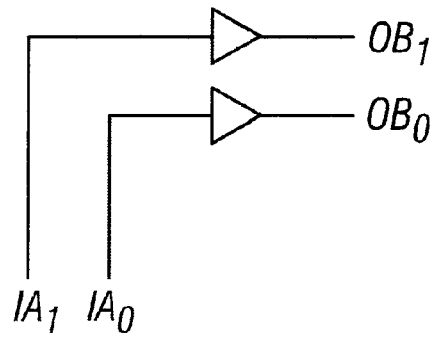
FIG. 20A        FIG. 20B
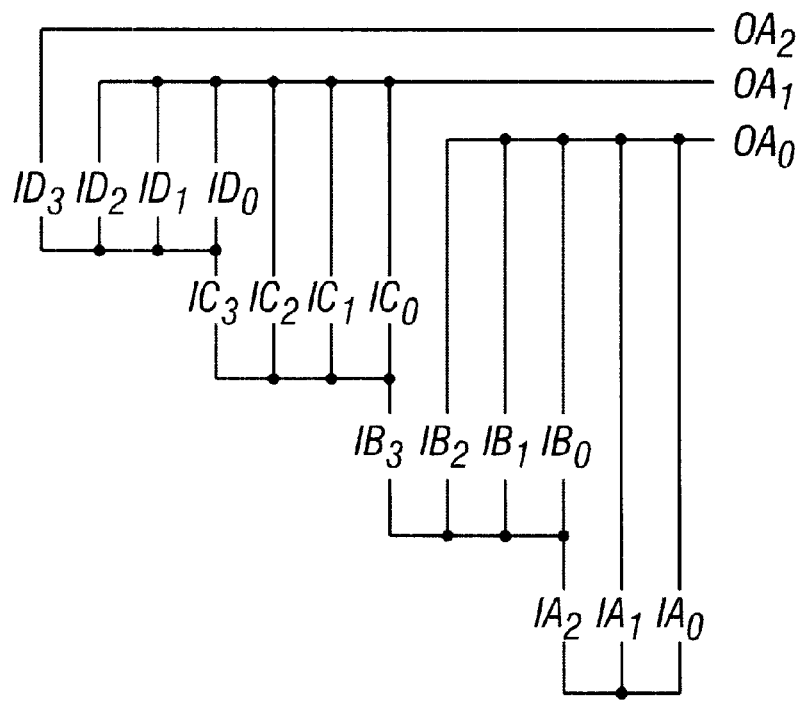
FIG. 21

US 6,557,021 B1

ROUNDING ANTICIPATOR FOR FLOATING POINT OPERATIONS

This application claims the benefit of the earlier filed U.S. Provisional Pat. App. Ser. No. 60/163,652, filed Nov. 4, 1999 (04.11.99), entitled "Rounding Anticipator for Floating Point Operations", which is incorporated by reference for all purposes into this specification.

BACKGROUND OF THE INVENTION

1. Field of the Invention

The present invention relates to improving the performance of floating point execution units in a processor. More particularly, the present invention provides a method and apparatus that anticipates the need to round the result of a floating point operation, and performs that rounding in parallel with normalization process.

2. Description of the Related Art

Within a processor, arithmetic operations may be performed on operands stored in a format known as floating point. An American national standard has been developed in order to provide a uniform system of rules for governing the implementation of floating point arithmetic systems. This standard is identified as ANSI/IEEE Standard No. 754-1985, and is incorporated by reference in this application. As discussed in further detail below, ANSI/IEEE 754-1985 includes rules for representing and storing floating point operands, rules for manipulating them to perform arithmetic operations, and rules for rounding and expressing the result of the arithmetic operations(s).

According to the standard, the typical floating point arithmetic operation may be accomplished in single precision, double precision, or extended precision format. Each of these formats utilizes a sign, exponent, and fraction field, where the respective fields occupy predefined portions of the floating point number. In addition, the extended precision format includes a mantissa field, which includes the fraction field plus an additional bit, the L bit, that is merely implied in the single- and double-precision formats.

The L bit is created by control logic when the exponent of the floating point number has a nonzero value. The L bit is written into the arithmetic registers in first bit position to the left of the fraction field of floating point numbers expressed in the extended precision format. For single- and double precision floating point numbers that have non-zero exponents, the L bit is not explicitly represented in the IEEE representation, but rather, is understood by the control logic to be present and to have a value of 1.

FIG. 1 illustrates the IEEE format for a 32-bit single precision number where the sign field is a single bit occupying the most significant bit position; the exponent field is an 8-bit quantity occupying the next-most significant bit positions; and the fraction field occupies the least significant 23 bit positions. In the case of a double precision floating point number, the sign field is a single bit occupying the most significant bit position; the exponent field is an 11-bit field occupying the next-most significant bit positions; and the fraction field is a 52-bit field occupying the least significant position. The format of the extended precision floating point number requires a single sign bit, a 15 bit exponent field, and a 64-bit mantissa field that includes the fraction and the L bit.

After each floating point intermediate arithmetic result is developed, it must be normalized and rounded if a round control bit is set. Normalization refers to the process of manipulating the exponent and fraction of an unnormalized intermediate floating point result so that the most significant binary "1" of the mantissa resides in the L bit, which is the most significant bit of the mantissa. The exponent is decremented for each 1-bit left-shift of the mantissa.

To implement the rounding rules required by ANSI/IEEE standard 745-1985, certain additional indicator bits may be set by the floating point logic during arithmetic operations. These bits generally indicate a loss of precision of a floating point number, such as might occur when an operand is right-shifted to align it for addition and one or more bits are shifted off the right side of the register. These lost precision bits are known as the "guard" bit G, a "round" bit R, and a "sticky" bit S. The G and R bits are treated as if they are a part of the fraction; they are shifted with the rest of the fraction during alignment and during normalization, and they are included in all arithmetic operations. The S bit is not shifted with the fraction but is included in the arithmetic. It acts as a "catcher" for 1's shifted off the right of the fraction. When a 1 is shifted off the right side of the fraction, the S bit will remain set until normalization and rounding are finished. Setting, interpreting, and using the G, R, and S bits to create a round control bit or a signal indicating whether or not rounding is required is well known in the art.

ANSI/IEEE standard 745-1985 requires that floating point units implement a minimum of four different rounding modes and to select which rounding mode is appropriate for various floating point operations. The four different rounding approaches are (1) round-to-nearest, wherein numbers having lost precision greater than ½ of their least significant bit are rounded up, numbers having lost precision less than ½ of their least significant bit are rounded down, and numbers having lost precision equal to ½ of their least significant bit are rounded either up or down, to ultimately achieve an even number (i.e., to end in zero); (2) round-toward-positive-infinity, wherein numbers are always rounded up if positive and down if negative; (3) round-toward-negative-infinity, wherein numbers are always rounded down if positive and up if negative; and (4) round-toward-zero, wherein the lost precision bits are always truncated. Notably, the implementation of modes 1, 2, and 3 always requires a method or means to locate and increment the bit that occupies the round increment position of the normalized intermediate result. Incrementing this bit may then ripple through the higher-order-bits in the intermediate result to produce the final, normalized, rounded result.

A typical independent floating point unit 10 having a multiply unit 12 that is completely separate from the add unit 14 is shown in FIG. 2A. In the FIG. 2A addition unit 14, one of two input operands A and B may first be shifted in the Aligner 16, and then added together in the Adder 18 to produce an unnormalized intermediate result (A+B). This intermediate result is then passed to a leading zero/one detector (LZD)20 which produces shift control signals for the normalizer 22. The normalizer 22 produces a normalized intermediate result by shifting the unnormalized mantissa result left by an amount specified by the LZD shift control signals. The exponent is decremented by one for each bit position that the mantissa is shifted to the left until the most significant bit position of the mantissa (the leading bit) becomes a one. The rounder 24 increments the normalized intermediate result, which is then typically passed to a multiplexer 26, where either the incremented result or the non-incremented result is selected to produce the final result, depending upon the ANSI/IEEE standard 745-1985 rounding scheme appropriate for the operation.

In prior art floating point units, as shown in FIG. 2A, normalization and rounding have usually been performed sequentially. This causes the latency of the execution, pipeline to include the full delay of both the normalizer and rounder circuits. In an effort to improve floating point performance, designers have employed various techniques to reduce the latency of the floating point execution pipeline, including anticipating the need for rounding ("early rounding") and executing rounding in parallel with normalization ("parallel normalization and rounding"). For example, U.S. Pat. No. 4,562,553 to Mattedi et al. and U.S. Pat. No. 5,390,134 to Heikes et al. both describe an early round technique. U.S. Pat. No. 5,550,768 to Ogilvie et al. utilizes a parallel normalization and rounding technique. Parallel normalization and rounding techniques are also more fully described in a copending patent application, U.S. patent application Ser. No. 09/120,775, filed Jul. 22, 1998 (22.07.1998), now U.S. Pat. No. 6,185,593, entitled "Method and Apparatus for Parallel Normalization and Rounding Technique for Floating Point Arithmetic Operations", which is incorporated by reference into this disclosure.

These techniques do improve the performance of independent (non-multiply-add) multiply and add pipelines, because they eliminate the majority of the rounding delay. However, they have not proven useful in fused multiply-add floating point execution units such as the fused multiply-add floating point execution unit shown in FIG. 2B, primarily because predicting the location that the round increment bit will occupy after the intermediate result is normalized is much more difficult in a fused multiply-add floating point unit.

Both the early rounding technique and the parallel normalization and rounding technique require that the approximate location (one of three positions) of the round increment position be known prior to normalization. In both techniques, the round increment position can be relatively easily determined because in independent (non-multiply-add) multiply and add pipelines, the unnormalized intermediate mantissa result for floating point arithmetic operations will always be in one of the following four possible formats:

(1) 1.XXX..XX (2) 0.1XXX..XX (3) 0.0XXX..XX (4) 1X.XXX..XX

In the first format, normalization is not required since the most significant bit position of the mantissa (the leading bit) is a one. Rounding may be required. In the second format, a 1-bit shift left is required to normalize the mantissa. Rounding may be required. The third format can only be achieved as a result of an effective subtract operation where the difference between the exponents of the two operands was zero or one. If there was no shifting for alignment (because the exponents were equal) then G=R=S=0 for both operands. If the lesser operand was shifted right one position for alignment (as would be the case where the exponent of the lesser operand was one less than the exponent of the greater operand), only the G bit could be set, if the least significant bit of the lesser operand was 1. Since a minimum 2-bit shift left is required for normalizing an intermediate result in format three, the guard bit (G) will be forced to zero as zeros are shifted into the R bit. When G=R=S=0, then the normalized intermediate result is exact and rounding is not possible regardless of the rounding mode. Therefore, rounding is never required for intermediate results in format three.

Conceptually, the fourth format requires a 1-bit right shift. Format four does not actually require normalization, but rounding may be required. Therefore, of the four possible formats, only the first, second and fourth may require rounding. Each of these formats dictates a unique round increment position because the shift for normalization is known and constant. Consequently, there are only three possible round increment positions for every unnormalized intermediate result that requires rounding. The round increment position for any unnormalized intermediate result that requires rounding can be ascertained by examining its unnormalized format, and selecting the round increment position dictated by that format.

Unfortunately, using this technique to perform early rounding and/or parallel normalization and rounding is not practical for a conventional fused multiply-add pipeline because the approximate location of the round increment position is unknown prior to normalization. This is the case because conventional fused multiply-add pipelines use an "offset" mantissa alignment method which results in a 3M+1 bit wide unnormalized intermediate mantissa result, where M is the width of the source mantissas. For example, assume a typical multiply-add operation of the type typically performed in a fused multiply-add pipelines: A×C+B. In performing this operation, operand B is always aligned to the A×C product. The operand B alignment amount can be determined from the equation $$\text{shift\_count} = (E_a + E_c) - E_b + \text{offset}$$

where $E_a$ represents the exponent of operand A, $E_b$ represents the exponent of operand B, and $E_c$ represents the exponent of operand C. The offset value is 55 for double precision operations. The format for a double precision unnormalized intermediate mantissa that results from an A×C+B operation performed in a fused multiply-add floating point unit is shown in FIG. 3.

A negative shift_count results in an alignment amount of 0-bits. A positive shift_count results in an alignment amount equal to shift_count. To illustrate, if a multiply-add operation (A×C+B) is executed and $E_b$ is equal to or greater than $(E_a+E_c)$+offset, the B operand mantissa will align such that it resides exactly within the most significant M-bits of the unnormalized intermediate mantissa data format because the resulting shift_count will be zero or negative, forcing an alignment amount of 0-bits. In this case the offset method prevents any overlap between operand B and the A×C product. If $E_b=(E_a+E_c)$ the offset alignment method will align the operand B mantissa such that its radix point is exactly positioned with the A×C product radix point. If $(E_a+E_c)=11$ and $E_b=1$ then the alignment amount is calculated to be 10+offset. Due to the offset value (55 for double precision operations) many leading zeros may exist in an unnormalized intermediate result even if rounding is possible. Unlike the independent floating point add pipeline, the fused multiply-add pipeline does not produce an unnormalized intermediate result that requires rounding, where there are only three normalization shift possibilities, and therefore, only three possible round increment positions. The number of possible round increment positions for a fused multiply-add pipeline is greater than the offset (55 for double precision operations).

The present invention is a rounding anticipator method and apparatus that can be used in any floating point execution unit, but is especially useful in fused multiply-add floating point execution units where prior techniques to eliminate or reduce the delay of the rounder have not proven useful. The present invention includes a 53-bit incrementer for anticipatory rounding that employs a fast carry propagate technique known as carry lookahead. The 53-bit incrementer used in the present invention is implemented in four levels of N-NARY logic, three of which operate in parallel with the normalizer. This results in an effective latency of the present invention rounding anticipator of only one logic level.

The present invention accepts data from the coarse, medium, and fine shift functions of the normalizer to develop a normalized and incremented intermediate result, which is then selected or not selected, depending upon the normalized result and the rounding scheme appropriate for the operation.

NARY logic is described in a copending patent application, U.S. patent application Ser. No. 09/19355, filed Feb. 5, 1998, now U.S. Pat. No. 6,066,965, and titled "Method and Apparatus for a N-NARY logic Circuit Using 1 of 4 Signals", (hereafter, "the N-NARY Patent"). As described in the N-NARY Patent, N-NARY logic uses a bundle of N wires routed together between different logic circuits, where information is encoded in the N wires, and where at most one and only one wire of the bundle of wires is true during an evaluation cycle. For example, a 1-of-4 N-NARY signal is a bundle of 4 wires that is capable of being encoded to represent 4 different values, and where at most, only one wire within the 4-wire bundle is true during an evaluation cycle. As explained in the N-NARY patent, a 1-of-4 N-NARY signal C, which comprises output wires $C_3$, $C_2$, $C_1$, and $C_0$ can be encoded to represent two boolean bits A and B, as follows:

| Bit A Binary Value | Bit B Binary Value | N-Nary C decimal value | N-NARY Signal Output Wires Asserted | | | |
|---|---|---|---|---|---|---|
| | | | $C_3$ | $C_2$ | $C_1$ | $C_0$ |
| 0 | 0 | 0 | 0 | 0 | 0 | 1 |
| 0 | 1 | 1 | 0 | 0 | 1 | 0 |
| 1 | 0 | 2 | 0 | 1 | 0 | 0 |
| 1 | 1 | 3 | 1 | 0 | 0 | 0 |

The 53-bit incrementer that comprises the rounding anticipator of the present invention incorporates basic N-NARY design principals described in the N-NARY Patent, and fast carry propagate techniques implemented in N-NARY logic in a 32-bit N-NARY incrementer described in U.S. patent application Ser. No. 09/206,830, filed Dec. 7, 1998 (07.12.1998), now U.S. Pat. No. 6,347,327, entitled "Method and Apparatus for N-NARY Incrementer" (hereafter, "the Incrementer Patent"). As described in the Incrementer Patent, carries propagate across a given dit only if that dit equals 3 when encoded in N-NARY logic, and will propagate across a block of dits only if all dits equal 3. For illustrative purposes only, FIG. 4 shows the conventional 32-bit N-NARY incrementer disclosed in the Incrementer Patent. Those unfamiliar with the workings of the conventional 32-bit N-NARY incrementer, including the methodologies for processing and resolving speculative propagate signals, are encouraged to refer to that patent for a complete understanding of the fast carry techniques described there and utilized in the present invention. In addition, the Incrementer Patent also provides a complete description of the "shorthand" N-NARY notation that is used herein to depict the various gates implemented in the present invention in N-NARY logic. Both the N-NARY Patent and the Incrementer Patent are hereby incorporated by reference into this disclosure for all purposes.

SUMMARY

The present invention comprises a method and apparatus that performs anticipatory rounding of intermediate results in a floating point arithmetic system while the intermediate results are being normalized by a normalizer that includes coarse, medium, and fine shifting. One embodiment of the present invention includes four logic levels, implemented in N-NARY logic. In the first logic level, coarse propagation information for preselected coarse propagation bit groups is encoded from the coarse shift output from the normalizer. In the second logic level, medium propagation information for preselected medium shift bit groups is derived by combining coarse propagation information for various bit groups from Level 1, selected according to the value of the medium shift select signal from the normalizer. In the third logic level, top bit, middle bit, and bottom bit propagation information is derived for preselected top groups, middle groups, and bottom groups of bit positions of the medium shift output, as a function of the value of the fine shift select signal. This information is derived by selectively combining propagation information from the second logic level with medium shift output bit values. In the fourth logic level, an incremented, normalized intermediate single- precision or double-precision mantissa result is produced by combining fine shift output bit values with propagation information for the appropriate top bit group, middle bit group, and bottom bit group.

BRIEF DESCRIPTION OF THE DRAWINGS

To further aid in understanding the invention, the attached drawings help illustrate specific features of the invention and the following is a brief description of the attached drawings:

FIGS. 18–25 show shorthand representations of the nine different Level 3A N-NARY gates, according to one embodiment of the present invention.

DETAILED DESCRIPTION OF THE INVENTION

The present invention comprises a method and apparatus that performs anticipatory rounding of intermediate results in a floating point arithmetic system while the intermediate results are being normalized. One embodiment of the present invention includes four logic levels, implemented in N-NARY logic. Propagation information is derived at each level by examining bits of the normalizer outputs as they become available, and qualifying that information with the normalizer's medium and fine shift select signals. In the fourth logic level, an incremented, normalized intermediate single- precision or double-precision mantissa result is produced by combining fine shift output bit values with propagation information for the appropriate top bit group, middle bit group, and bottom bit group. This disclosure describes numerous specific details that include specific structures, circuits, and logic functions in order to provide a thorough understanding of the present invention. One skilled in the art will appreciate that one may practice the present invention without these specific details. In addition, structures that are well known in the art are not described in detail so as not to obscure the present invention.

Figure 5:
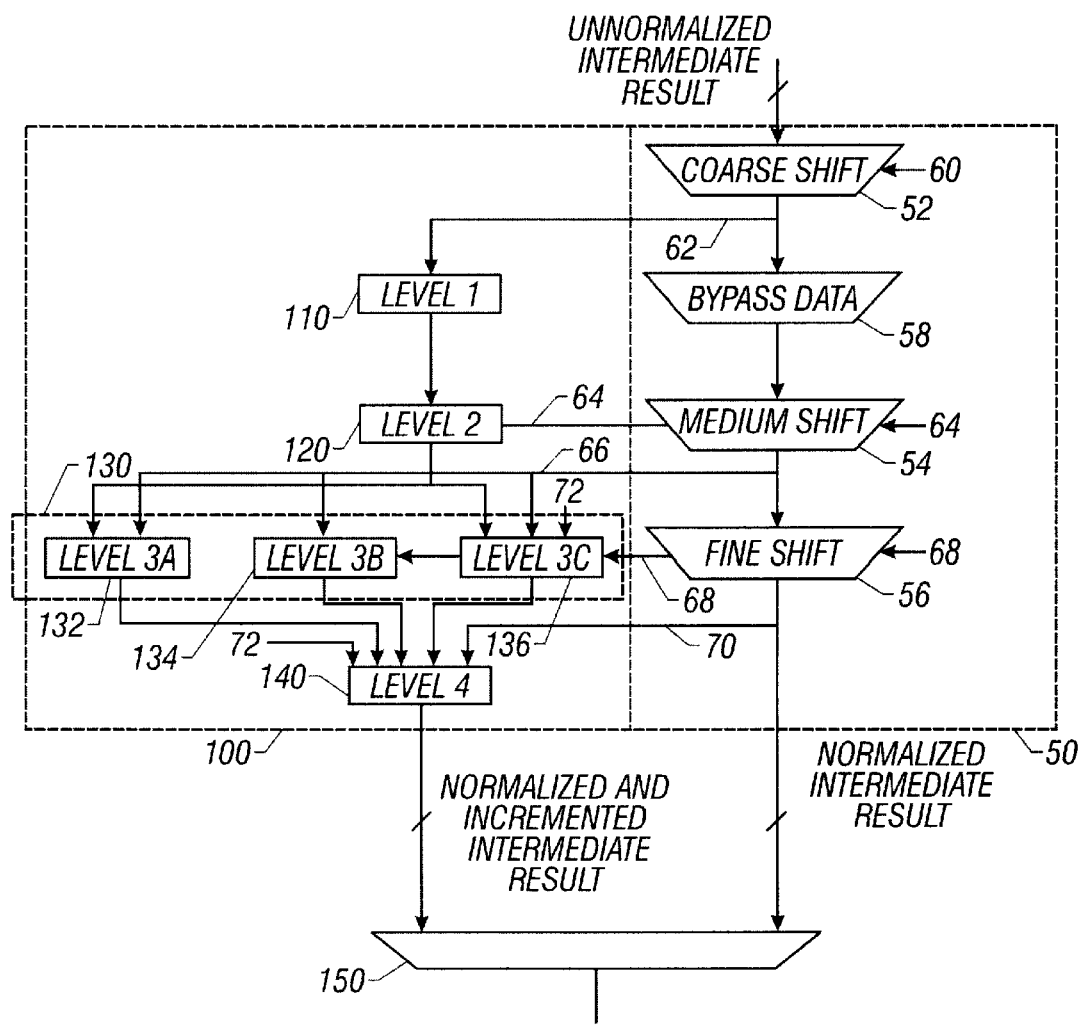
FIG. 5 is a block diagram of a floating point normalization and rounding circuit with the rounding function performed according to the present invention.

FIG. 5 shows a high-level block diagram of the four-level rounding anticipator 100 of the present invention and its interface with the coarse shift, medium shift, and fine shift outputs and medium and fine shift select signals. As shown in FIG. 5, the rounding anticipator 100 accepts the shift outputs and shift select signals as they become available from the normalizer 50. Those skilled in the art will understand that normalizer 50 is a typical normalizer well known in the art, comprising a series of multiplexers 52, 54, and 56 that accept control signals 60, 64, and 68 generated by a leading zero/one detector or anticipator, and perform coarse, medium, and fine shifting, respectively, of the unnormalized intermediate mantissa to achieve a normalized intermediate result.

For example, in the typical normalizer 50, the coarse shifter 52 might shift the intermediate result mantissa 0, 16, 32, or 48 bits, as selected by the coarse shift select signal 60. The output of the coarse shifter 52 is a 70-bit wide coarse shift output 62. The medium shifter 54 may shift the coarse shifter output 62 an additional 0, 4, 8, or 12 bits, as selected by the medium shift select signal 64. The output of the medium shifter 54 is a 58-bit wide medium shift output 66. The fine shifter 56 may shift the medium shifter output 66 an additional 0 to 4 bits, as selected by the fine shift select signal 68. The output of the fine shifter 56 is a normalized single- or double-precision intermediate result, which is an input to the final multiplexer 150.

The typical normalizer 50 shown in FIG. 5 also includes an optional bypass data logic level 58, which represents an insertion point for floating-point-type data that is handled by other execution units for effeciency reasons. Those skilled in the art will recognize that the inclusion of a bypass data insertion point in a floating point normalizer is a matter of design choice. The bypass data logic level is included in FIG. 5 only to demonstrate that the present invention can operate in parallel with a bypass data logic level in the normalizer.

Similarly, although not shown in FIG. 5, a normalizer 50 that might be used in a fused multiply-add floating point unit might include one or more additional multiplexers that pre-process intermediate results before the coarse shifter 52. These pre-processing shifts could be considered to be "super-coarse" shifting to aid in reducing the bit-width of the intermediate result to a reasonable size for the coarse shifter. For example, a super-coarse shifter might pre-shift a 160-bit mantissa 0, 64, or 128 bits in preparation for the coarse shifter. Alternatively, the coarse shifter 52 could shift intermediate results in additional 16-bit increments to accommodate extended-precision or offset-aligned mantissas. Those skilled in the art are familiar with design approaches appropriate for normalizing extended-precision and offset-aligned mantissas. As the present invention does not depend upon or interface with the results of a super-coarse shifter, no further detail is provided herein.

In the preferred embodiment of the present invention described herein, the rounding anticipator 100 is a four-logic level, 53-bit incrementer that uses fast carry propagate methods and is implemented in N-NARY logic. The preferred embodiment of the rounding anticipator is appropriate for use in single- or double-precision multiply, add, or fused multiply-add floating point units. However, after reading this disclosure and/or practicing the present invention, one skilled in the art will recognize that the methods, techniques, and structures detailed herein could be applied to implement a wider incrementer capable of accommodating extended-precision add, multiply, and fused add-multiply floating point operations.

FIG. 5 shows the four logic levels 110, 120, 130, and 140 of the present invention 100, together with their inputs from the coarse, medium, and fine shifters in the normalizer. As shown in FIG. 5, the coarse shift output 62 is an input to Level 1 110. The results of Level 1, together with the medium shift select signal 64, are inputs to Level 2 120. The Level 2 results, together with the medium shift output 66, the increment position signal 72, and the fine shift select signal 68, are inputs to Level 3 130. FIG. 5 shows that Level 3 includes three logic partitions, Level 3A, designated as 132, Level 3B, designated as 134, and Level 3C, designated as 136. The output of each of the Level 3 partitions, along with the fine shift output 70 and the increment position signal 72, are inputs to Level 4 140. The output of Level 4 is then an input to the final multiplexer 150 at the bottom of FIG. 5, which selects either the normalized intermediate result available from the normalizer 50, or the normalized, incremented intermediate result available from Level 4 of the rounding anticipator 100. Multiplexer 150 selects the final result based upon the ANSI/IEEE Standard No. 745-1985 rounding scheme selected as appropriate for the operation and the results.

Figure 6A:
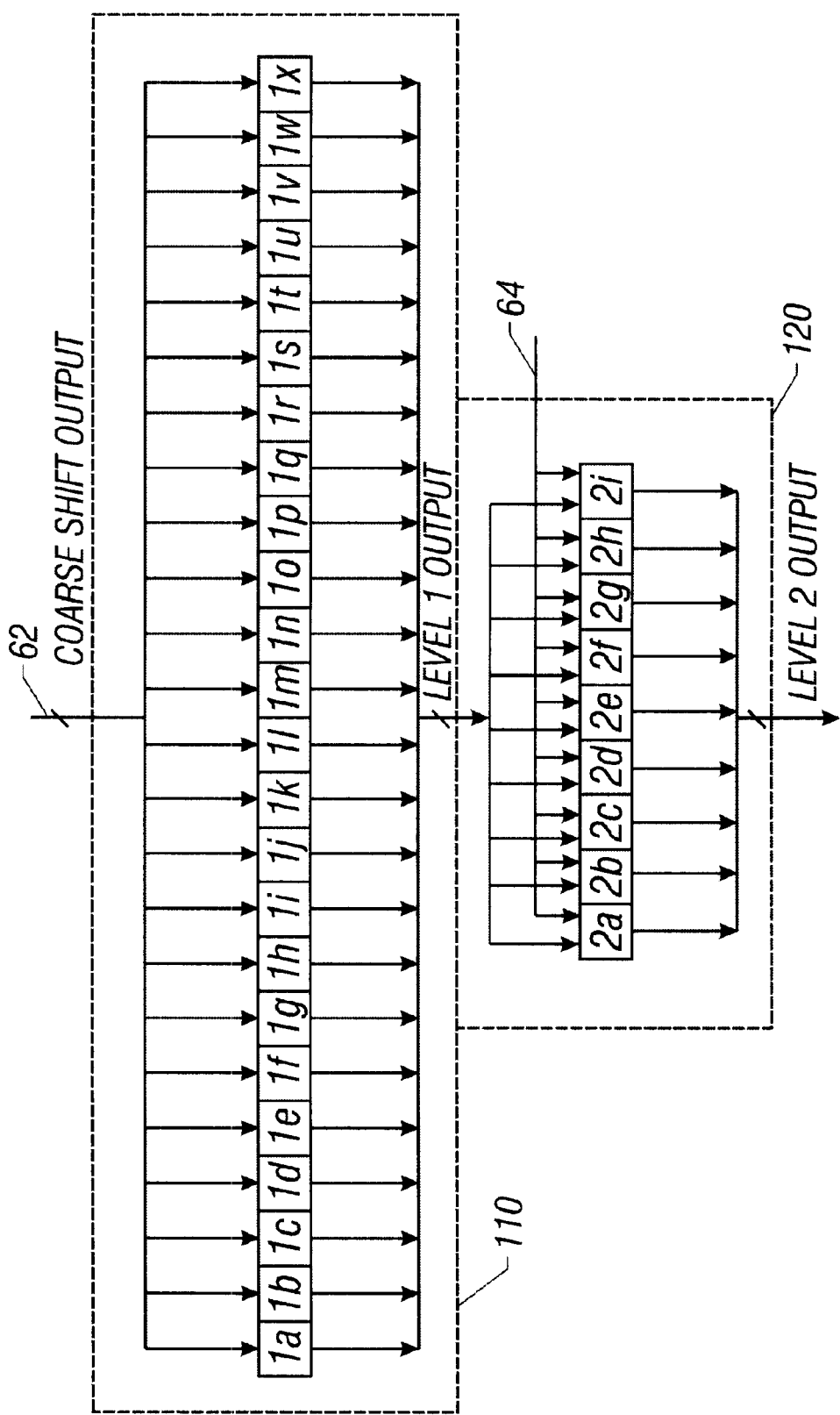
FIG. 6A–6C is a block diagram showing the gate arrangement of the four logic levels of the present invention.
Figure 6B:
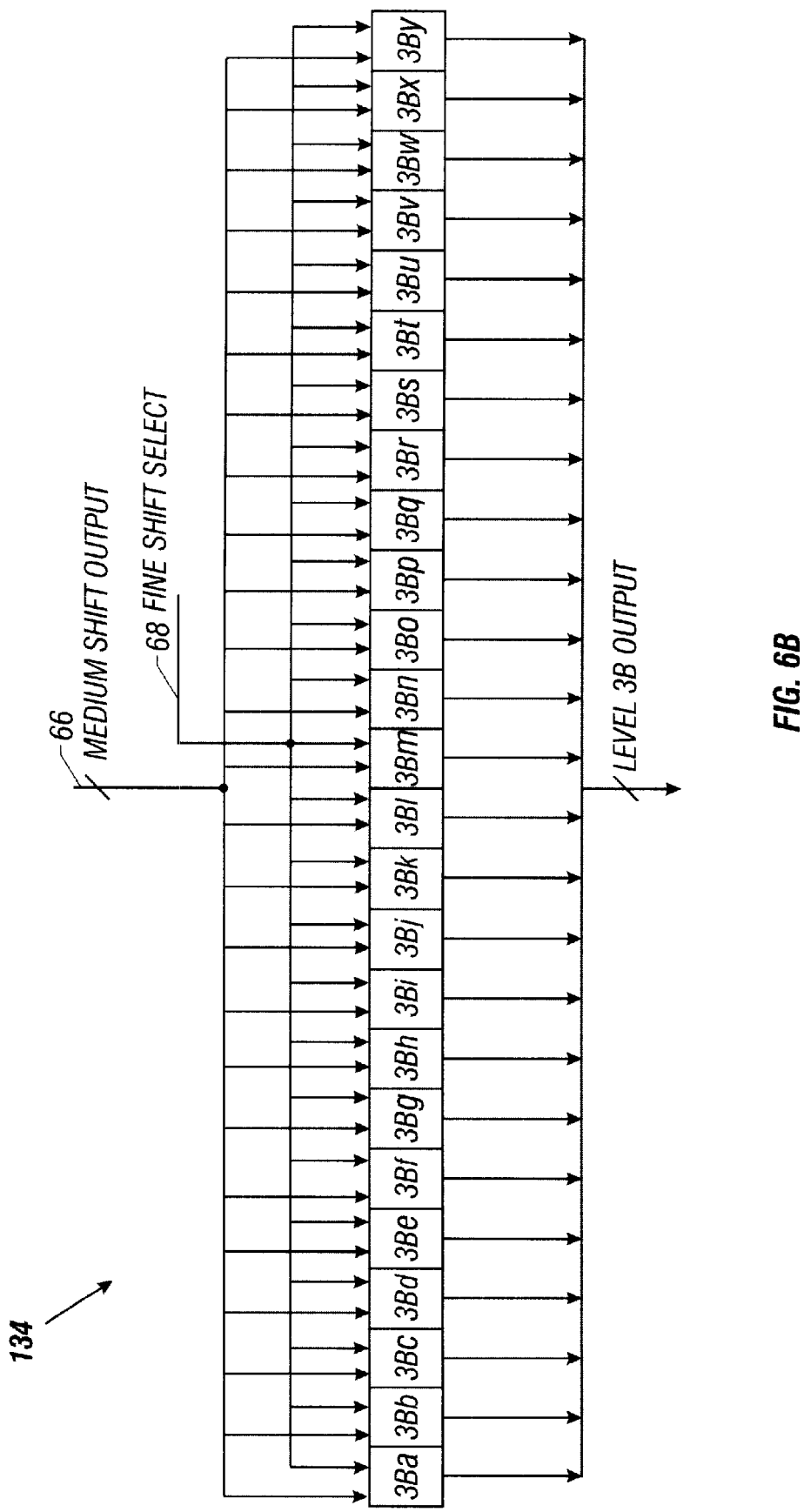
Figure 6C:
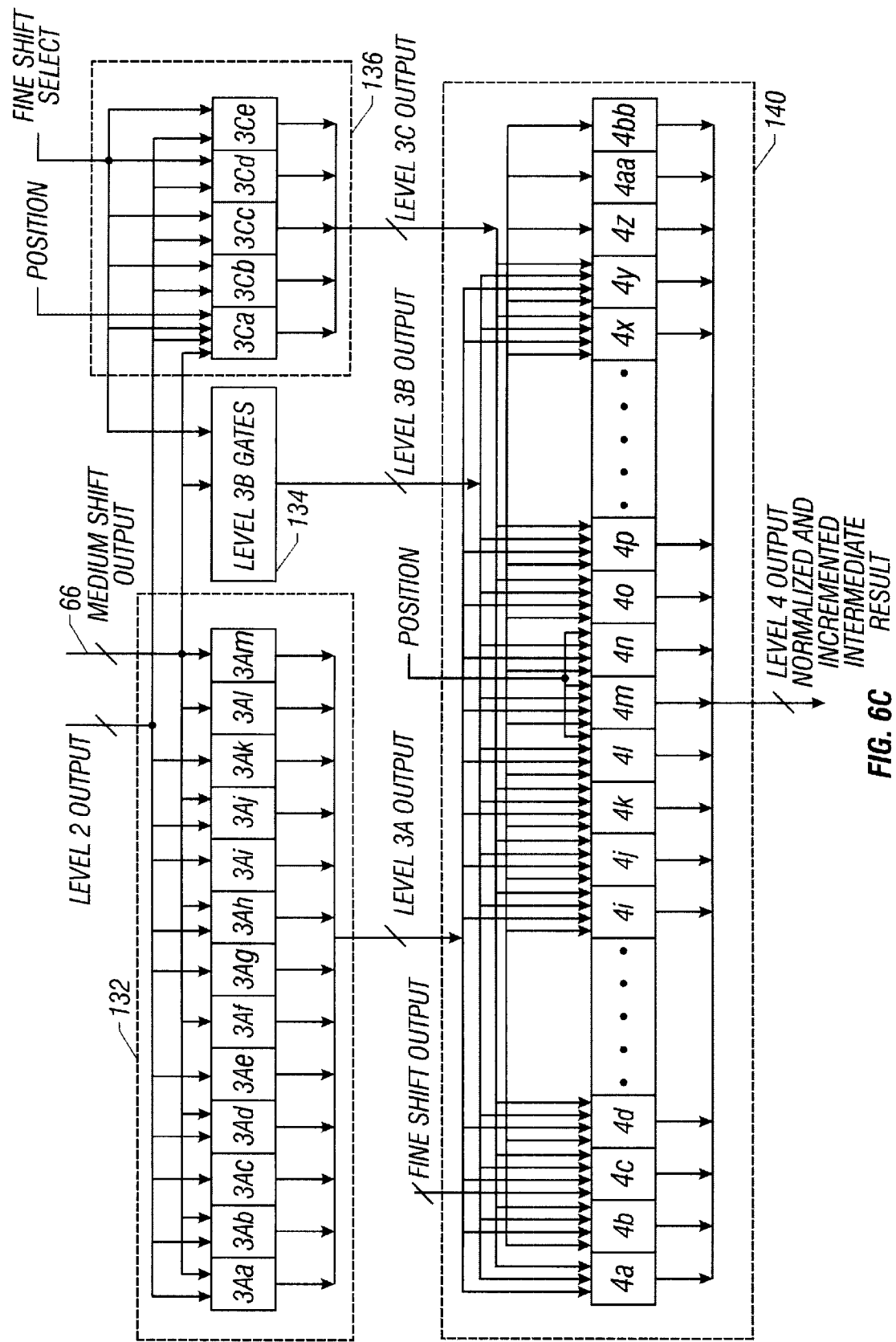

FIGS. 6A, 6B, and 6C provide an overview of the four levels of the present invention, showing the logic flow between the levels, the general gate arrangement of each level, and the gate inputs at each level. As shown in FIG. 6A, the preferred embodiment of Level 1 110 includes 24 gates, designated 1*a* through 1*x*. Level 2 120 includes 9 gates, designated 2*a* through 2*i*. The Level 1 output and the medium shift select signal 64 from the medium shifter in the normalizer are inputs to the Level 2 gates.

As shown in FIG. 6B, Level 3B 134 includes 25 gates, designated 3B*a* through 3B*y*. The medium shift output 66 and the fine shift select signal 68 are inputs to each Level 3B gate. FIG. 6C shows that Level 3A 132 includes 13 gates designated 3A*a* through 3A*m*, with inputs from Level 2 and from the medium shift output 66. Level 3C 136 includes 5 gates designated 3C*a* through 3C*e*. FIG. 6C shows that the Level 3C gates have varying inputs. Finally, Level 4 140 includes 28 gates, designated as 4A*a* through 4A*bb*, most of which accept inputs from the fine shift output and Levels 3A, 3B, and 3C. Further detail regarding the design of each gate and the input signals to each gate is provided in the following discussion and accompanying figures.

Level 1 Logic

Level 1 of the rounding anticipator comprises four different versions of N-NARY gates arranged in an array of 24 N-NARY gates. A shorthand representation of the four different types of Level 1 gates is shown in FIGS. 7A, 7B, 8, and 9. As shown in FIGS. 7A, 7B, 8, and 9, the Level 1 gates receive three or four 1-of-4 N-NARY input signals, where each 1-of-4 N-NARY signal represents one dit of the coarse shift output signal. Level 1 N-NARY outputs are either 1-of-3 signals (designated herein as signal OA), 1-of-2 signals (designated herein as signal OB) or 1-of-5 signals (designated herein as signal OC).

TABLE 1

Level 1 logic gates

Figure 7A:
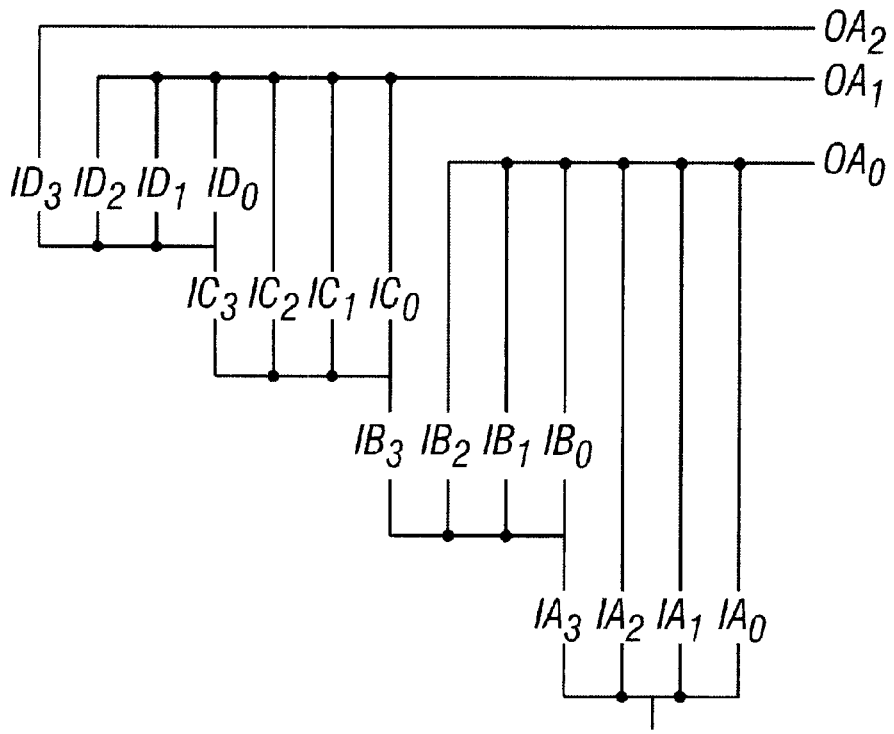
FIGS. 7A–7B, 8, and 9 are shorthand representations of the four different Level 1 N-NARY gates, according to one embodiment of the present invention.
Figure 7B:
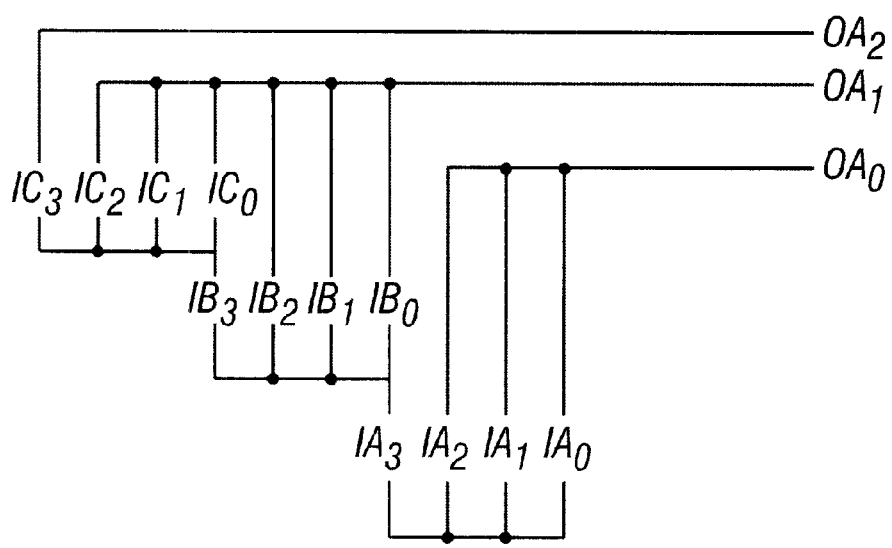
Figure 8:
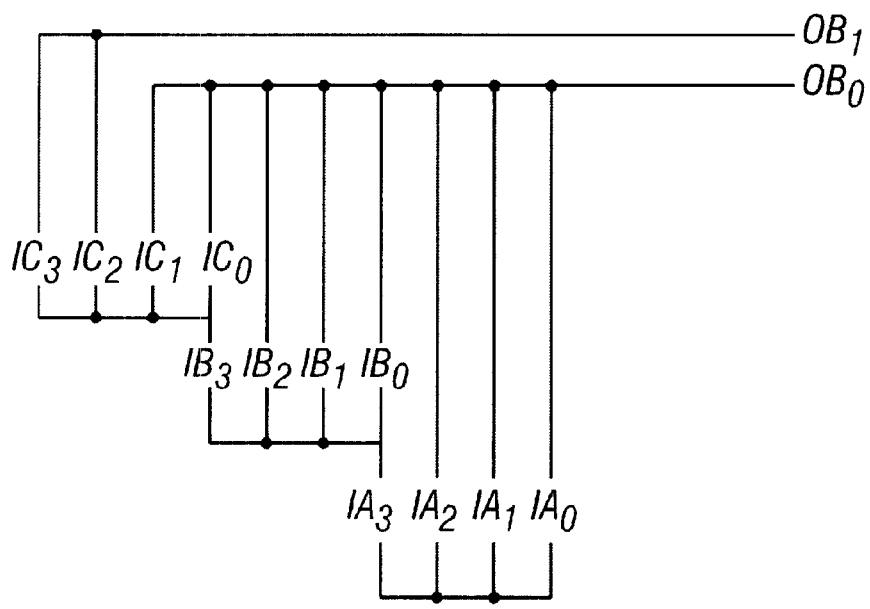
Figure 9:
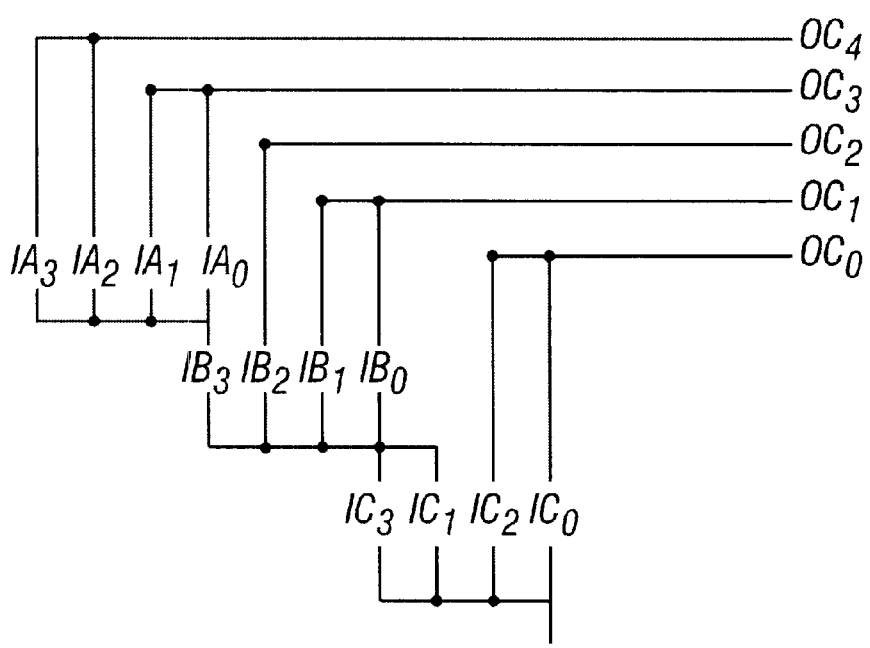

| Gate Name | FIGURE No. | Coarse shift output range | Coarse Propagation block size (bits) | Output Signal Name/Type |
|---|---|---|---|---|
| 1a | FIG. 7A | 61:54 | 8 | OA: 1-of-3 |
| 1b | FIG. 7A | 57:50 | 8 | OA: 1-of-3 |
| 1c | FIG. 7A | 53:46 | 8 | OA: 1-of-3 |
| 1d | FIG. 7A | 49:42 | 8 | OA: 1-of-3 |
| 1e | FIG. 7A | 45:38 | 8 | OA: 1-of-3 |
| 1f | FIG. 7B | 43:38 | 6 | OA: 1-of-3 |
| 1g | FIG. 7A | 41:34 | 8 | OA: 1-of-3 |
| 1h | FIG. 7B | 39:34 | 6 | OA: 1-of-3 |
| 1i | FIG. 7A | 37:30 | 8 | OA: 1-of-3 |
| 1j | FIG. 7B | 35:30 | 6 | OA: 1-of-3 |
| 1k | FIG. 7A | 33:26 | 8 | OA: 1-of-3 |
| 1l | FIG. 7B | 31:26 | 6 | OA: 1-of-3 |
| 1m | FIG. 7A | 29:22 | 8 | OA: 1-of-3 |
| 1n | FIG. 7A | 25:18 | 8 | OA: 1-of-3 |
| 1o | FIG. 8 | 21:17 | 5 | OB: 1-of-2 |
| 1p | FIG. 7A | 21:14 | 8 | OA: 1-of-3 |
| 1q | FIG. 8 | 17:13 | 5 | OB: 1-of-2 |
| 1r | FIG. 7A | 17:10 | 8 | OA: 1-of-3 |
| 1s | FIG. 9 | 16:13 | 4 | OC: 1-of-5 |
| 1t | FIG. 8 | 13:9 | 5 | OB: 1-of-2 |
| 1u | FIG. 9 | 12:9 | 4 | OC: 1-of-5 |
| 1v | FIG. 8 | 9:5 | 5 | OB: 1-of-2 |
| 1w | FIG. 9 | 8:5 | 4 | OC: 1-of-5 |
| 1x | FIG. 9 | 4:1 | 4 | OC: 1-of-5 |

Table 1 shows a gate design and output of the 24 Level 1 logic gates, along with the coarse shift output propagation bit range that each Level 1 gate output signal represents, according to one embodiment of the present invention.

FIGS. 7A and 7B show a preferred implementation of Level 1 gates 1a through 1n, 1p, and 1r. The gate shown in FIG. 7A receives four 1-of-4 N-NARY signals (signals IA, IB, IC, and ID), each representing coarse shift output data dits. For example, in gate 1a, IA represents coarse shift output bits 55:54, IB bits 57:56, IC bits 59:58 and ID bits 61:60. In gate 1b, IA represents coarse shift output bits 51:50, IB bits 53:52, IC bits 55:54, and ID bits 57:56. In gate 1c, IA represents coarse shift output bits 47:46, IB bits 49:48, IC bits 51:50, and ID bits 53:52, and so on.

In each gate implemented as shown in FIG. 7A, the gate output is a 1-of-3 N-NARY signal OA that provides propagation information about the 8-bit block of bits represented by the input signals. $OA_2$ is asserted when all bits within the block represented by the input signals are one. $OA_1$ is asserted when the most significant four bits within the block are not all one, and the remaining bits within the block are all one. $OA_0$ is asserted for all other patterns. $OA_2$, $OA_1$ and $OA_0$ can also be represented in the following shorthand notation:

$OA_2$: $(x'f'\|b'1 \ldots 1')$ $OA_1$: $(x'N'\|b'1 \ldots 1')$, where N!=x'f'

$OA_0$: else

If IA, IB, IC, and ID represent an 8-bit block of the coarse shift output, then the single output value of OA provides propagation information about the entire 8-bit block (if $OA_2$ is asserted, a carry in will propagate to the next higher bit block) or about the two 4-bit blocks (if $OA_1$ is asserted, a carry into the lower four bits will propagate to the higher four bits, but will not propagate out to the next higher bit block). If $OA_0$ is asserted, a carry-in to the 8-bit block will not propagate out to the next higher block.

The gate shown in FIG. 7B is similar to the FIG. 7A gate, except that there are only three input signals, IA, IB, and IC, each representing one dit of the coarse shift output. Therefore, although the output signal of gates implemented as shown in FIG. 7B has the same definition as the FIG. 7A gate output ($OA_2$ asserted when all bits are one, $OA_1$ asserted when the top four bits are not one and the remaining bits are one, and $OA_0$ asserted for all other patterns), it is a 6-bit block, rather than an 8-bit block, that is represented.

Those skilled in the art and familiar with N-NARY logic design techniques will recognize that alternatively, two 1-of-2 N-NARY gates could be used instead of the 1-of-3 N-NARY gate shown in either FIG. 7A or 7B. In this embodiment, one 1-of-2 gate output could provide information about the value of all eight (or six) bits, and the second 1-of-2 gate output could provide information about the value of the least significant four (or two) bits.

FIG. 8 shows a third type of Level 1 gate, having a 1-of-2 output signal, OB. The two output wires of OB provide information about two possible data patterns of interest within a 5-bit block: the case where all five bits are ones ($OB_1$ asserted), and the case where all five bits are not ones ($OB_0$ asserted). In one embodiment of this gate shown in FIG. 8, the inputs are three 1-of-4 N-NARY signals IA, IB, and IC, each of which represents two bits of data from the coarse output shifter. For example, in gate 1o, IA represents coarse shift output bits 21:20, IB bits 19:18 and IC bits 17:16. The output OB represents the data patterns of interest in coarse shift output propagation range 21:17. Bit 16 is not included in the propagation range, even though it was included as an input. This is because the inputs are dit-encoded. Even though bit 16 is not a useful input for the gate in FIG. 8, the gate must handle Bit 16 by effectively "don't caring" it.

The output function for the FIG. 8 gate can be described as:

$OB_1$: b'1 . . . 1'

$OB_0$: else

Finally, the fourth type of Level 1 gate, having a 1-of-5 output signal OC, is shown in FIG. 9. Gate output wires $OC_4$, $OC_3$, $OC_2$, $OC_1$ and $OC_0$ represent five possible data patterns within a 4-bit block:

| | |
|---|---|
| $OC_4$:b'1111' | ($OC_4$ is asserted when all four bits are ones) |
| $OC_3$:b'1110' | ($OC_3$ is asserted when the three most significant bits are ones and the least significant bit is zero) |
| $OC_2$:b'110X' | ($OC_2$ is asserted when the two most significant bits are ones, the next-most significant bit is a zero; the least significant bit can be either a or a zero) |
| $OC_1$:b'10XX' | ($OC_1$ is asserted when the most significant bit is a one, the next-most significant bit is a zero; the two least significant bits can be either a one or a zero) |
| $OC_0$:b'0XXX' | ($OC_0$ is asserted when the most significant bit is a zero, and the remaining bits can be either a one or a zero) |

As shown in FIG. 9, this gate receives three 1-of-4 input signals, IA, IB and IC, each representing coarse shift output data dits. For example, in gate 1s, IA represents coarse shift output bits 13:12, IB bits 15:14 and IC bits 17:16. The output OC then represents the data patterns of interest in coarse shift output propagation range 16:13. Bits 17 and 12 are not included in the propagation range, even though they were included as inputs. This is because the inputs are encoded. Even though bits 17 and 12 are not useful inputs for the gate in FIG. 9, the gate must handle these bits by effectively "don't caring" them.

Table 1 and FIGS. 7A, 7B, 8, and 9 therefore describe the 24-gate arrangement that comprises level 1 rounding anticipator. The level 1 rounding anticipator accepts an array of 1-of-4 N-NARY signals that are encoded to represent the bottom 62 bits of a 70-bit data output from the coarse shifter in the normalizer. These signals are then provided to the Level 1 gates to create the output signal described above for each type of gate, where each gate output signal conveys propagation information associated with its input bit range.

The output of the Level 1 logic of the present invention is 24 N-NARY signals, each of which has a decimal value that conveys propagation information corresponding to the data pattern of a specific bit field of the output of the coarse shifter in the normalizer. These 24 N-NARY signals are then passed to the level 2 logic of the present invention, for further processing as described below.

Level 2 Logic

Level 2 produces carry propagate information by further processing data obtained from Level 1 and qualifying it with the medium shift select input to the medium shifter in the normalizer. Propagate information is grouped into block sizes which are a maximum of 24-bits. Level 2 outputs are either 1-of-3, 1-of-2, 1-of-5 or 1-of-6 signals.

TABLE 2

Coarse Shift Output Bit Positions that Correspond to Medium Shift Select

| Medium Shift Select | Coarse Shift Output Bit Shifted into Medium Shift Output Bits 49:5 (Excludes top 8 bits and bottom 4 bits) | Coarse Shift Output Bits Shifted Into Medium Shift Output Bits 4:1 (Excludes guard bit) |
| --- | --- | --- |
| 0-bits | 61:17 | 16:13 |
| 4-bits | 57:13 | 12:9 |
| 8-bits | 53:9 | 8:5 |
| 12-bits | 49:5 | 4:1 |

Table 2 shows the coarse shift output bit positions (excluding the top 8 bits and the guard bit) that are selected by the normalizer as the medium shift output, according to the four possible values of the medium shift select signal. Recall that the output of the coarse shifter is a 70 bit wide data value and the output of the medium shifter is a 58-bit wide data value. If the top 8 bits of the coarse shift output are excluded, a 0-bit shift in the medium shifter means that the next 49 bits of the coarse shift output (bits 61:13) may participate in the result. Bit 12 is the guard bit, and the lower twelve bits (bits 11:0) will be discarded. Similarly, a four-bit shift in the medium shifter means that coarse output bit positions 69:66 (the most significant four bits of the coarse shift output) will be discarded, the next eight bits (65:58) are excluded for the time being, and the next 49 bits (57:9) may participate in the result. In this case, bit 8 is the guard bit, and the bottom eight bits (7:0) will be discarded. The present invention excludes the top eight bits of the medium shift output from Level 2 processing, and handles those bits in level 3B, as explained further below.

TABLE 3

Level 2 logic gates

| Gate Name | FIGURE Number | Medium shift output propagation range represented | Propagation Block Size (Bits) | Output Signal Type |
| --- | --- | --- | --- | --- |
| 2a | 10 | 49:34 | 16 | OA: 1-of-3 |
| 2b | 11 | 41:34 | 8 | OA: 1-of-3 |
| 2c | 12 | 33:10 | 24 | OA: 1-of-3 |
| 2d | 12 | 31:10 | 22 | OA: 1-of-3 |
| 2e | 13 | 25:5 | 21 | OA: 1-of-3 |
| 2f | 14 | 17:5 | 13 | OA: 1-of-3 |
| 2g | 15 | 9:5 | 5 | OB: 1-of-2 |
| 2h | 16 | 9:1 | 9 | OD: 1-of-6 |
| 2i | 17 | 4:1 | 4 | OC: 1-of-5 |

Table 3 summarizes the outputs of the nine Level 2 gates and the medium shift output propagation bit range that the outputs of the Level 2 gates represent. As discussed above, the Level 2 gates do not process propagation information for the top eight bits of the medium shift output (57:50) because that information is handled at level 3B. Therefore, the output of gate 2a is propagation information for the 16-bit block ranging from medium shift output bit position 49:34, the output of gate 2b is propagation information for the 8-bit block ranging from medium shift output bit position 41:34, and so forth.

Figure 10:
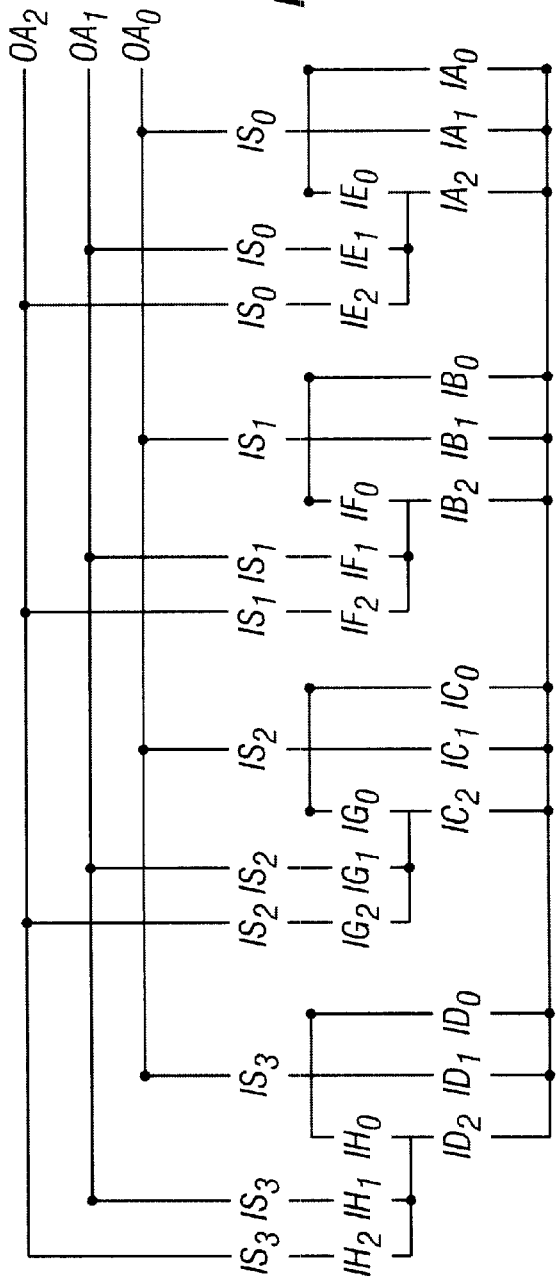
FIGS. 10–17 show shorthand representations of the eight different Level 2 N-NARY gates, according to one embodiment of the present invention.

FIG. 10 shows gate 2a of Level 2, according to one embodiment of the present invention. The three gate output wires ($OA_2$, $OA_1$ and $OA_0$) represent three possible propagation data patterns within bits 49:34 of the medium shift output. $OA_2$ is asserted when all bits within the block are one. $OA_1$ is asserted when the most significant four bits within the block are not all one, and the remaining bits within the block are all one. $OA_0$ is asserted for all other patterns.

The gate 2a input signals are eight 1-of-3signals IA through IH, plus IS, a 1-of-4 signal that represents the medium shift select signal. Signal IS is encoded as follows:

TABLE 4

Level 2 IS encoding

| IS line asserted | Medium Shift Select |
| --- | --- |
| $IS_0$ | shift 0 bits |
| $IS_1$ | Shift 4 bits |
| $IS_2$ | Shift 8 bits |
| $IS_3$ | Shift 12 bits |

Table 5 below summarizes the sources of the input signals to Level 2, gate 2a. By examining FIG. 10 in conjunction with Tables 3, 4, and 5, one skilled in the art will understand that the value of the gate 2a output signal, which represents propagation information associated with bits 49:34 of the medium shift output, is derived from propagation information encoded from coarse shift output bits 61:46 when the medium shift select is shift-zero; from coarse shift output bits 57:42 when the medium shift select is shift-four; from coarse shift output bits 53:38 when the medium shift select is shift-eight; and from coarse shift output bits 49:34 when the medium shift select is shift-twelve.

TABLE 5

Level 2, Gate 2a input signal information

| Gate 2a Input Signal | Input Signal Type | Level 1 gate source | Coarse Shift Output Bits Represented |
|---|---|---|---|
| IA | 1-of-3 | 1c | 53:46 |
| IB | 1-of-3 | 1d | 49:42 |
| IC | 1-of-3 | 1e | 45:38 |
| ID | 1-of-3 | 1g | 41:34 |
| IE | 1-of-3 | 1a | 61:54 |
| IF | 1-of-3 | 1b | 57:50 |
| IG | 1-of-3 | 1c | 53:46 |
| IH | 1-of-3 | 1d | 49:42 |
| IS | 1-of-4 | medium shift select | — |

Each of the Level 2 gates works like gate 2a, in that information encoded from the Level 1 gates is effectively selected by the value of the medium shift select signal and then combined to derive propagation information for a specific group of bits of the medium shift output. Signal IS is the same for all the Level 2 gates.

Table 6 below provides the Level 1 source gate and the coarse shift output bits represented for each input signal in each level 2 gate shown in FIGS. 10–17. Table 6 shows each Level 2 gate across the top, along with the figure number that shows the gate design according to one embodiment of the present invention, and the medium shift output block of bits for which the gate's output signal encodes propagation information.

TABLE 6

Level 1 source gates for Level 2 gate input signals

Figure 1:
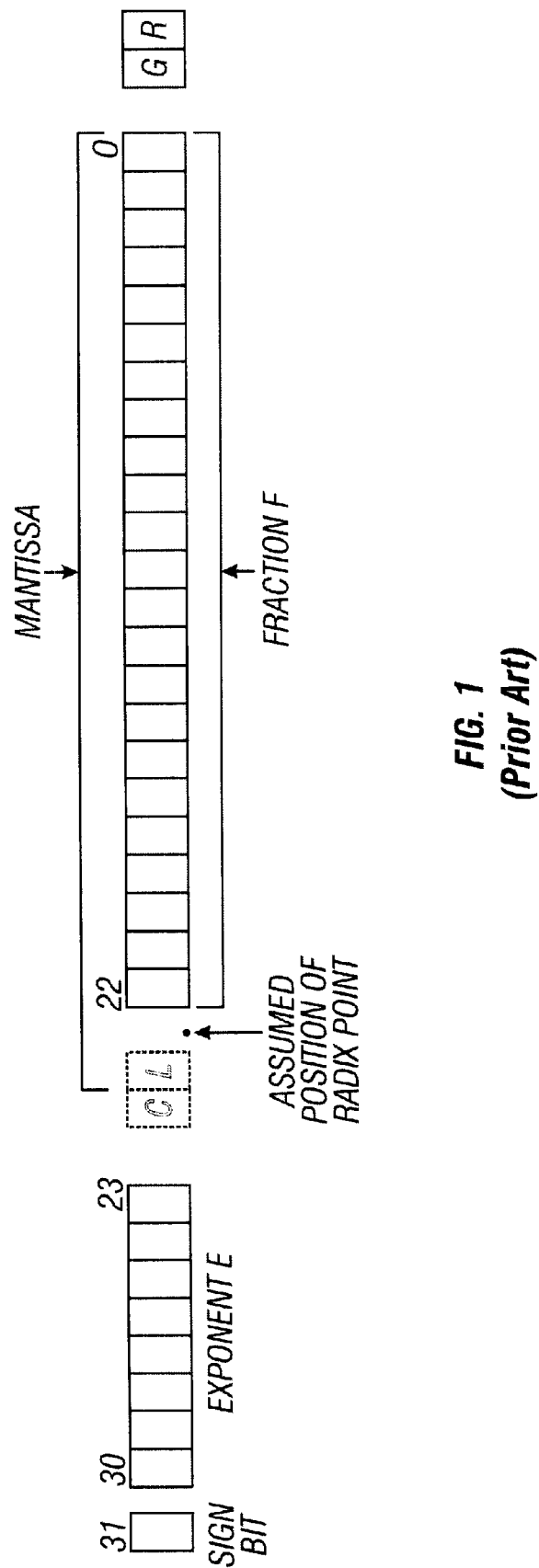
FIG. 1 illustrates the ANSI/IEEE 745-1985 standard bit format for representing a normalized single precision floating point number.
Figure 2A:
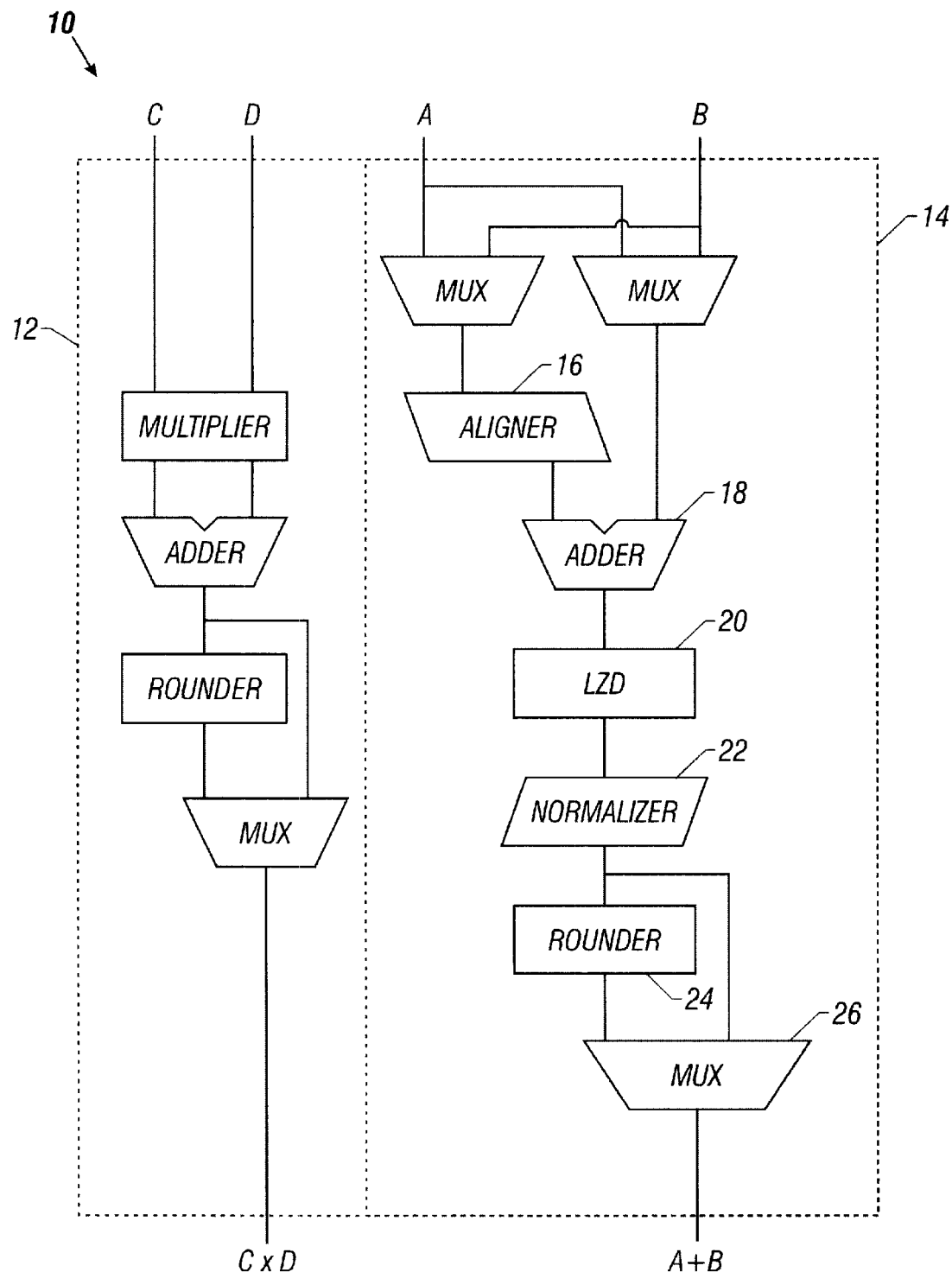
FIG. 2A is a block diagram of a typical floating point execution unit that includes independent multiply and add pipelines.
Figure 2B:
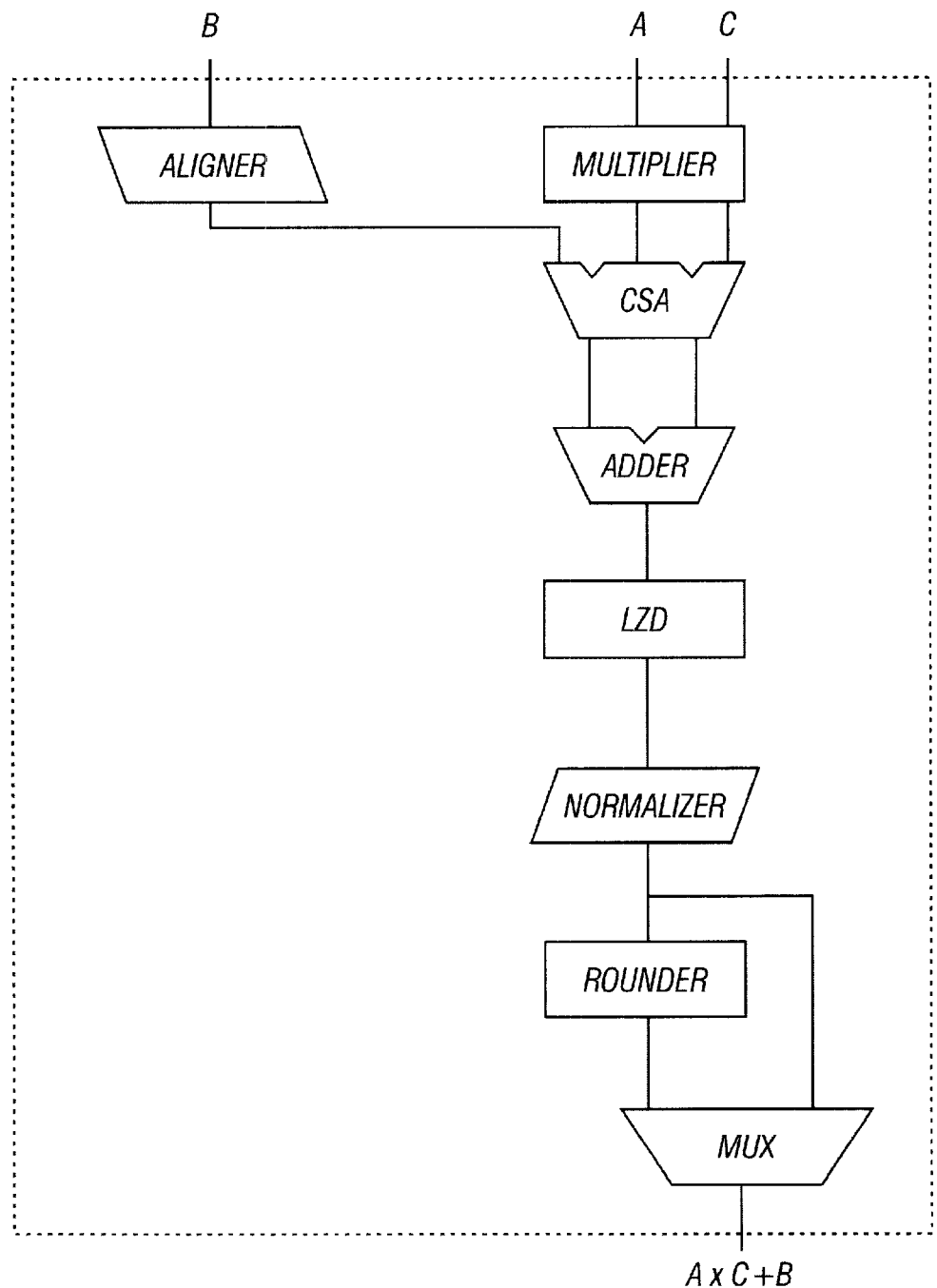
FIG. 2B is a block diagram of a floating point execution unit that incorporates a conventional fused multiply-add pipeline.
Figure 3:
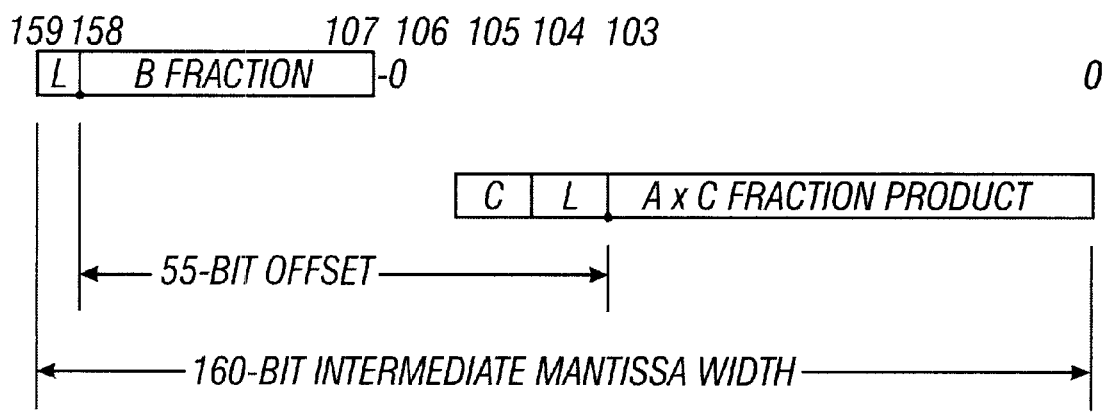
FIG. 3 is a block representation of the 160-bit double precision intermediate mantissa data format for a conventional fused multiply-add pipeline.
Figure 4:
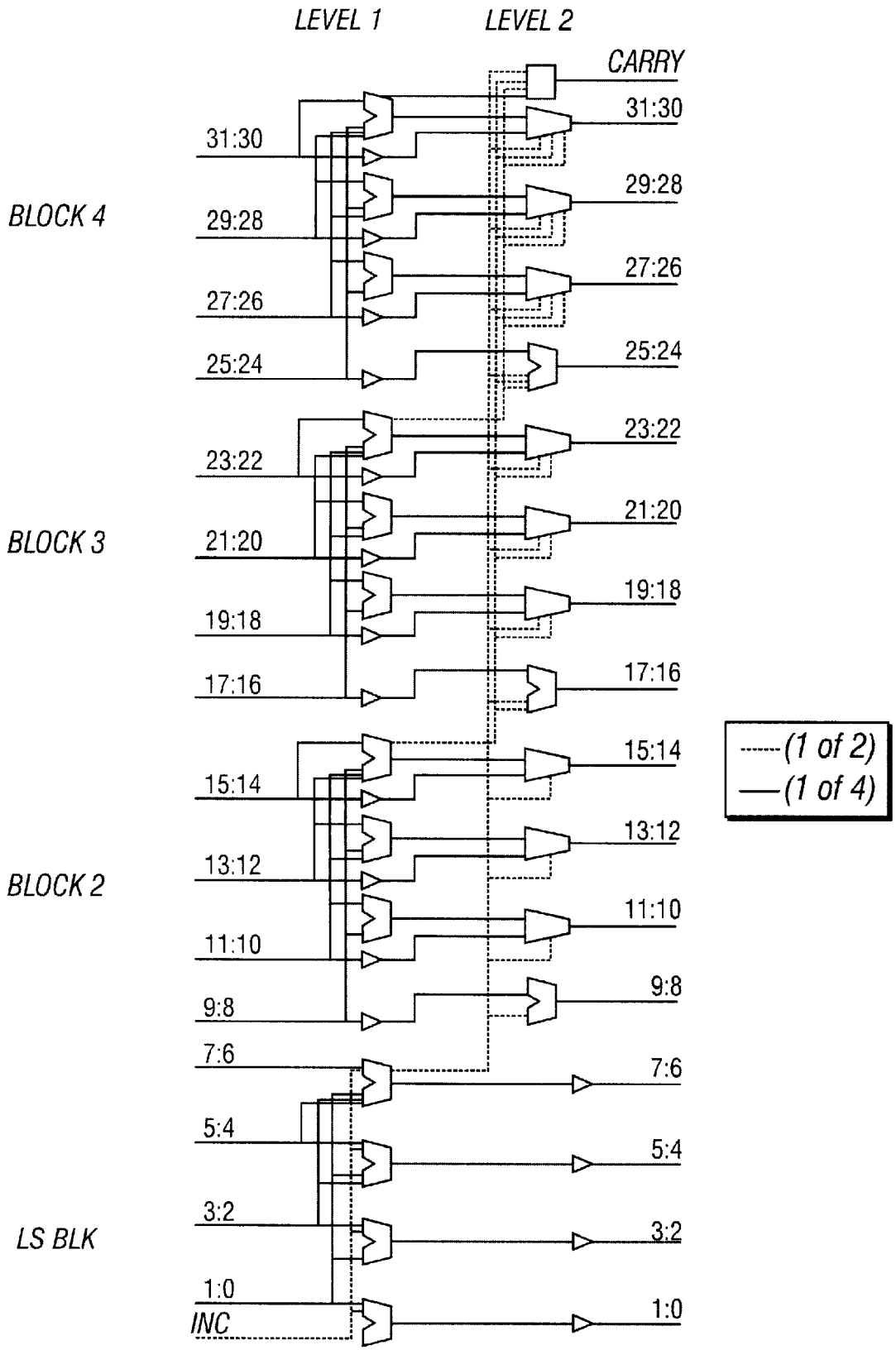
FIG. 4 is a block diagram of a conventional N-nary 32-bit incrementer.
Figure 11:
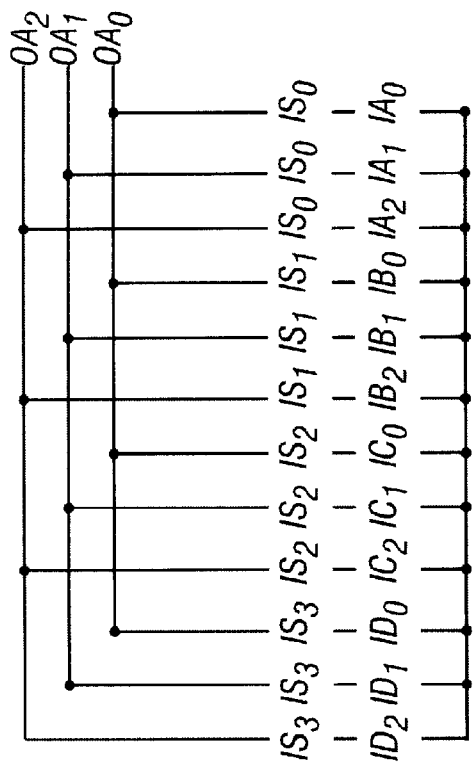
Figure 12:
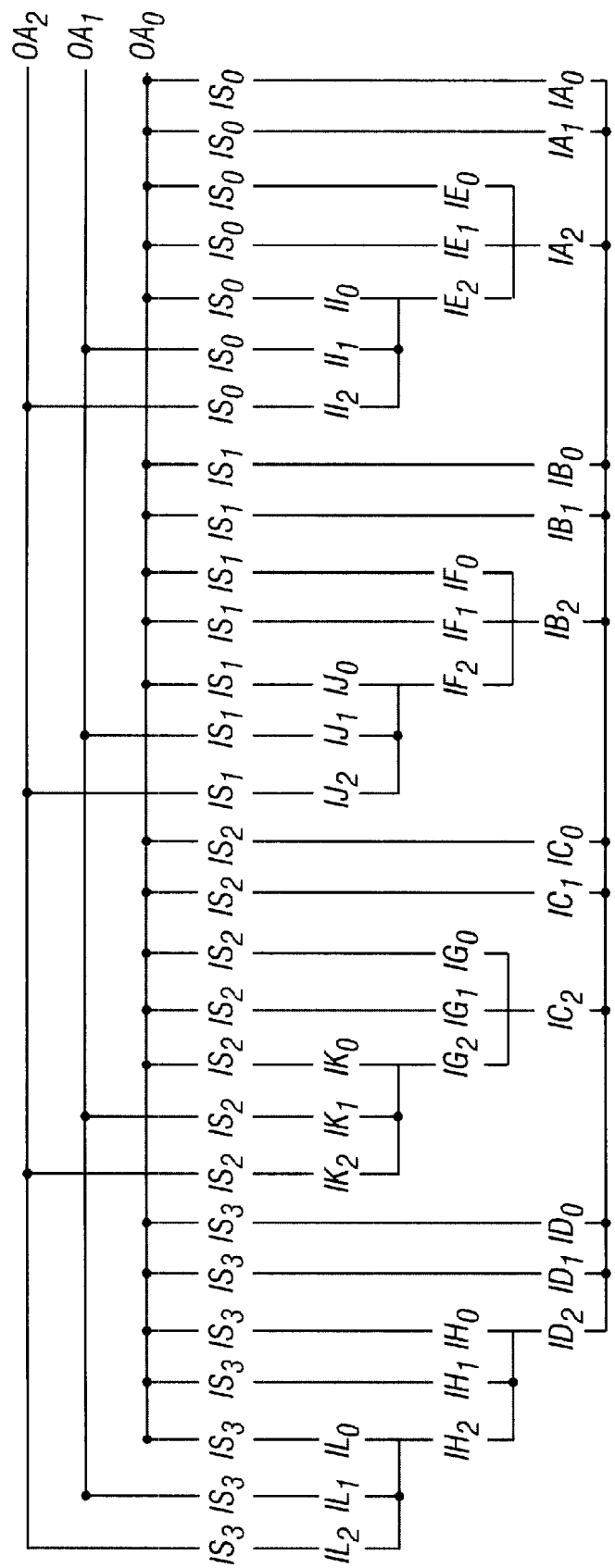
Figure 13:
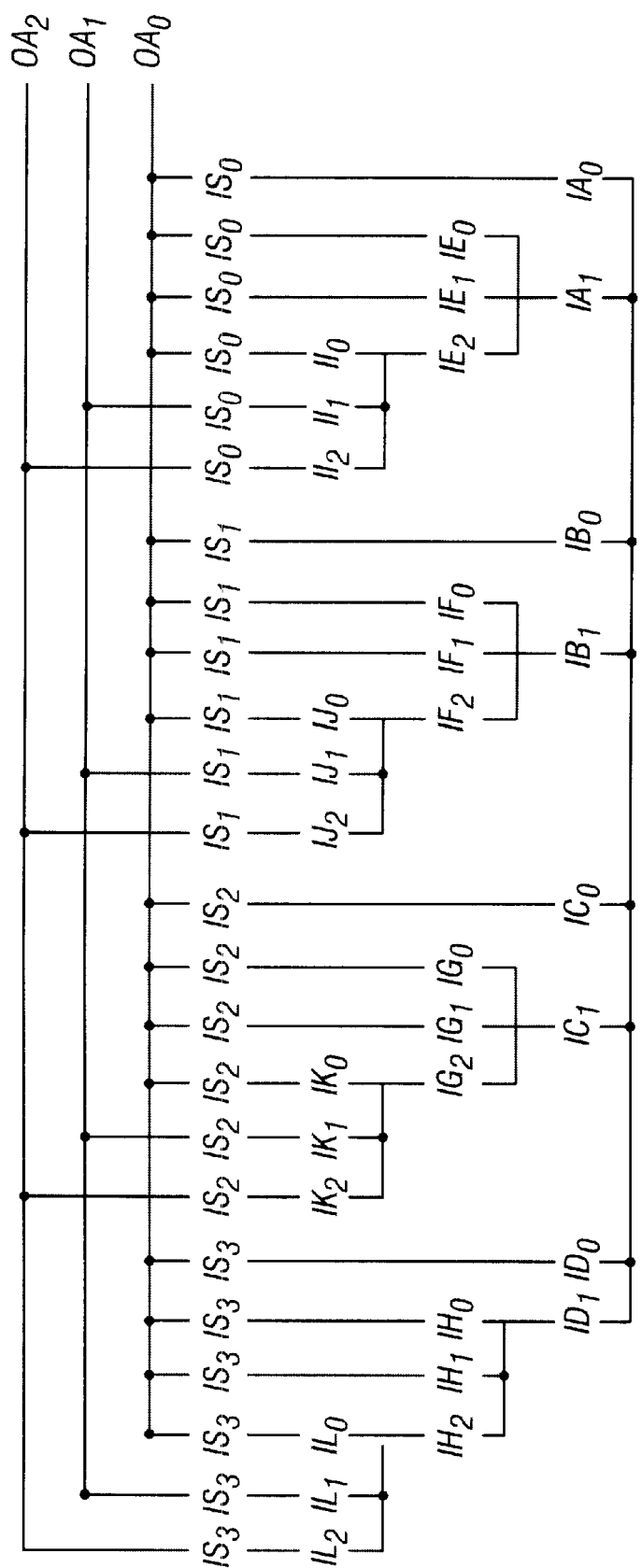
Figure 14:
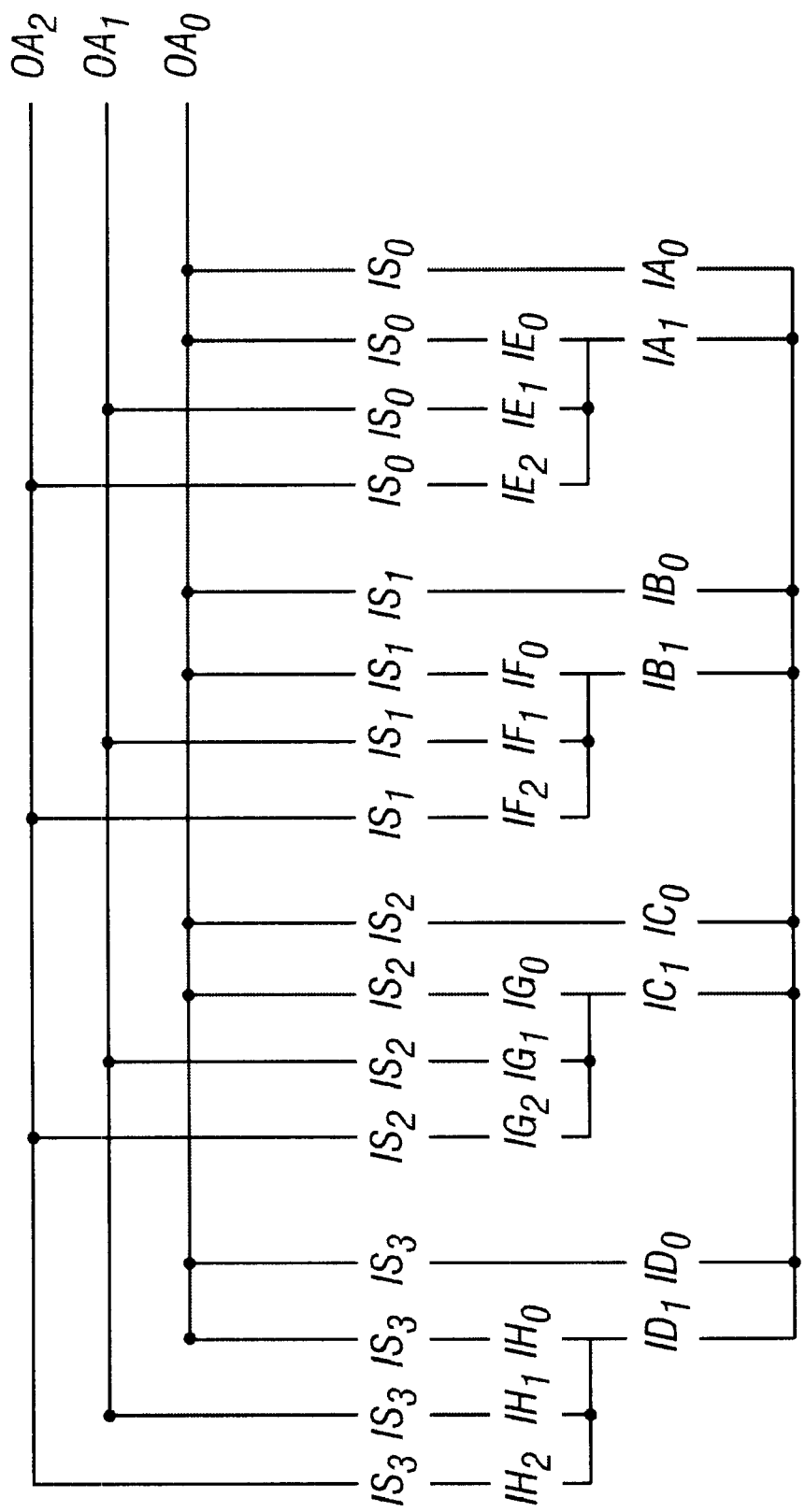
Figure 15:
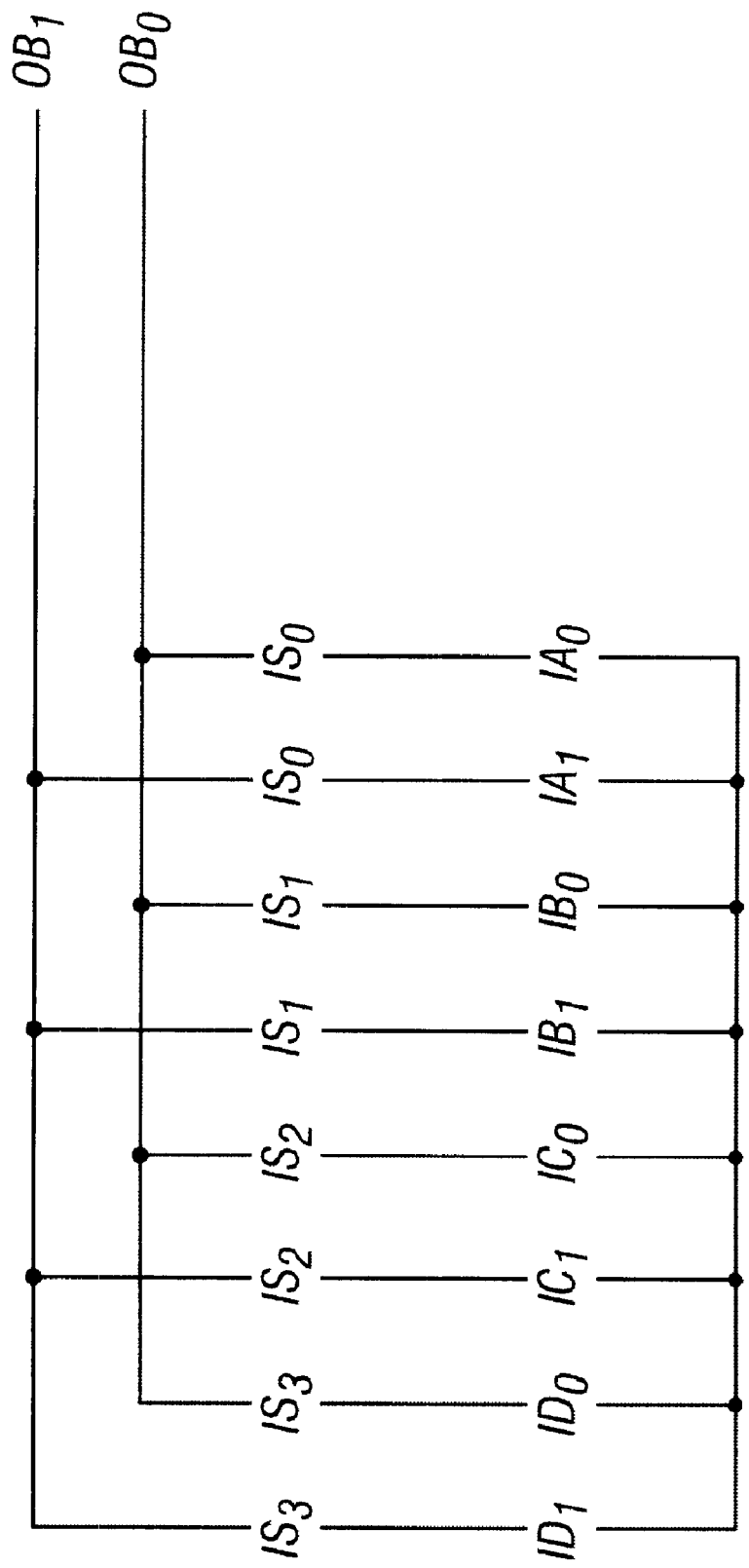
Figure 16:
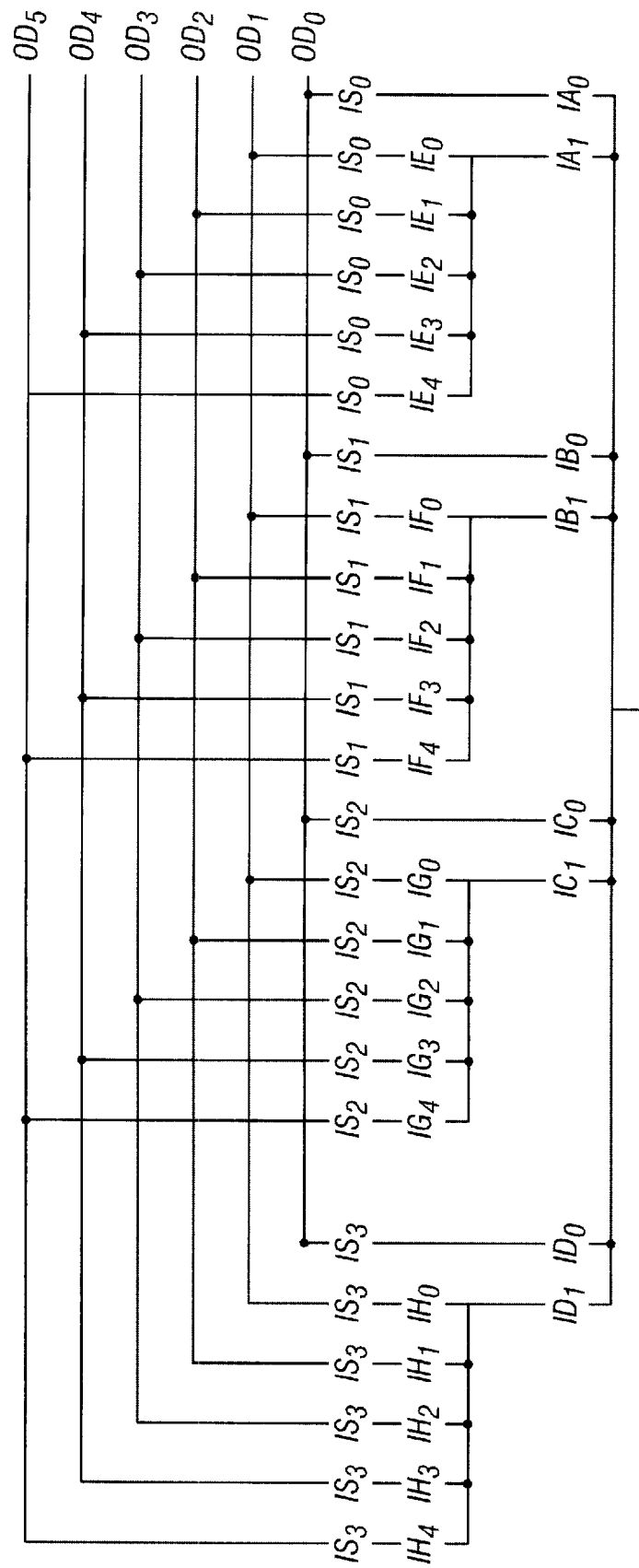
Figure 17:
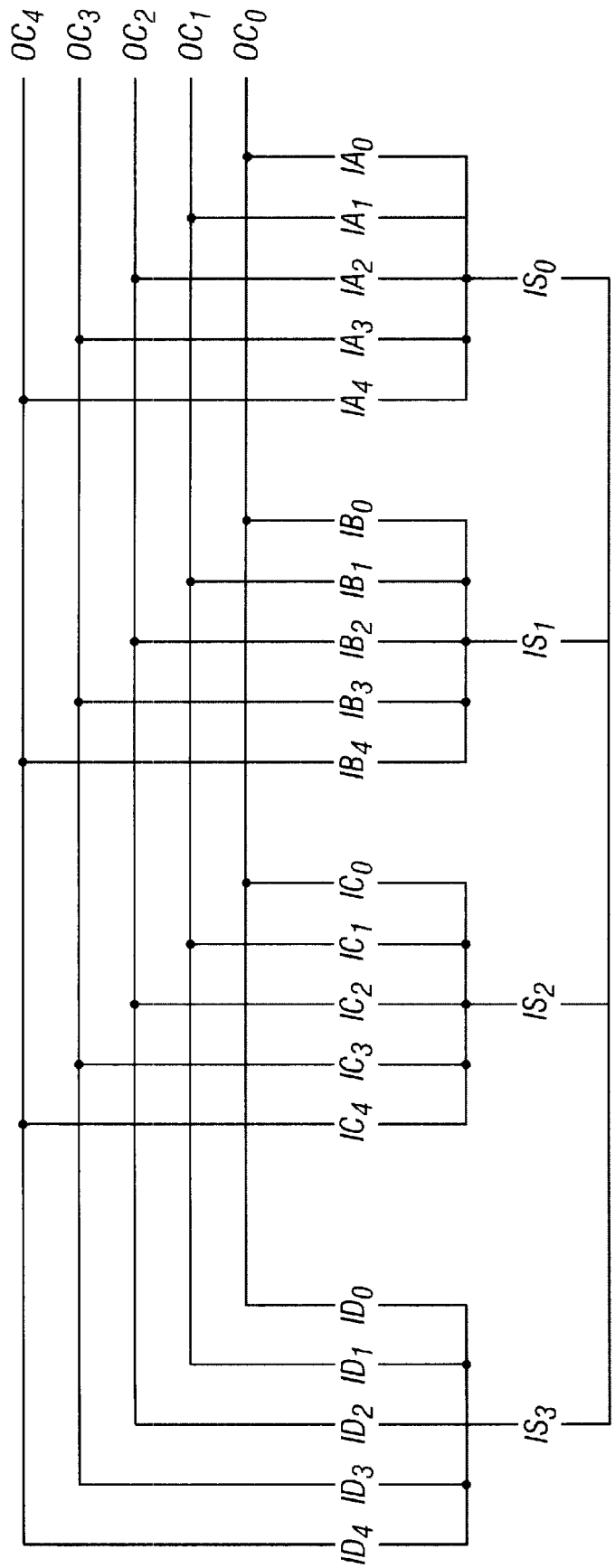
Figure 25:
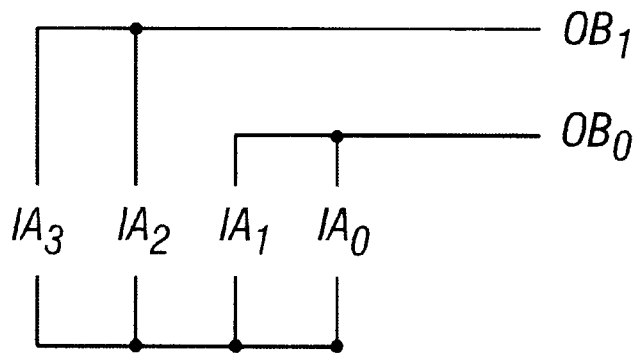
Figure 31:
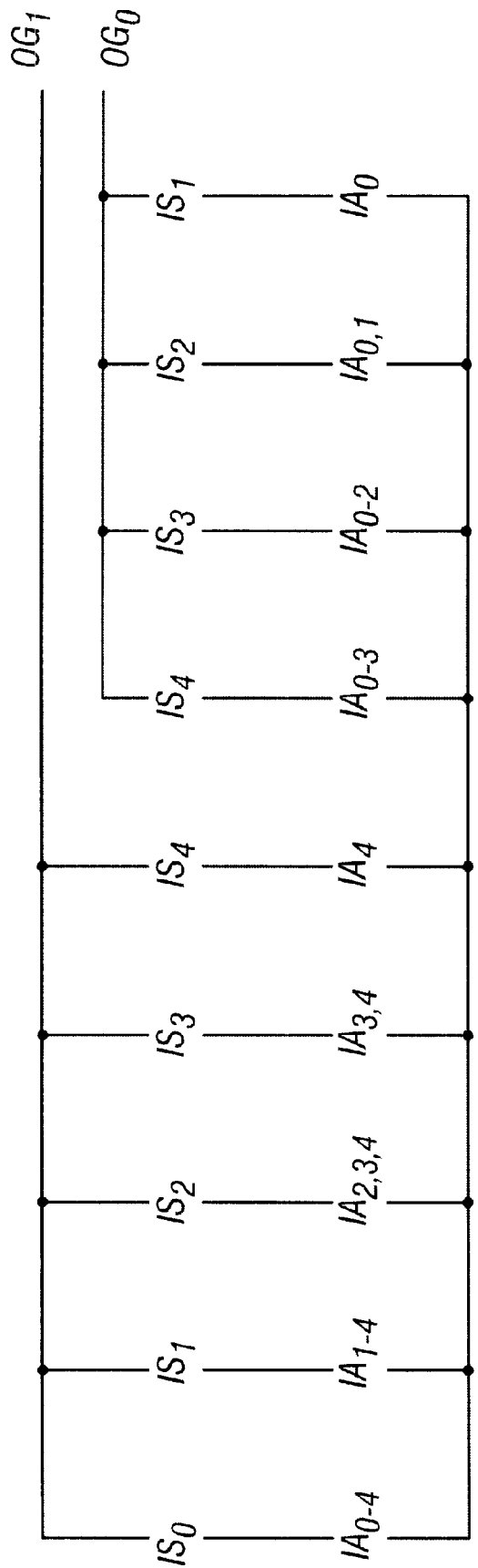
Figure 32:
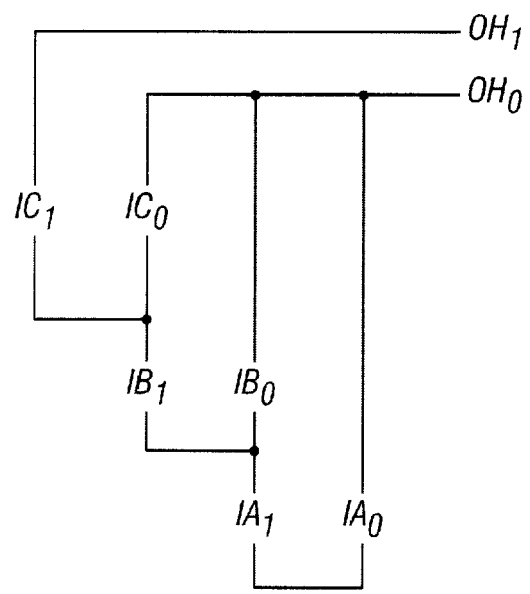
FIGS. 32–43 show shorthand representations of the twelve different types of Level 4 N-NARY gates, according to one embodiment of the present invention.
Figure 33:
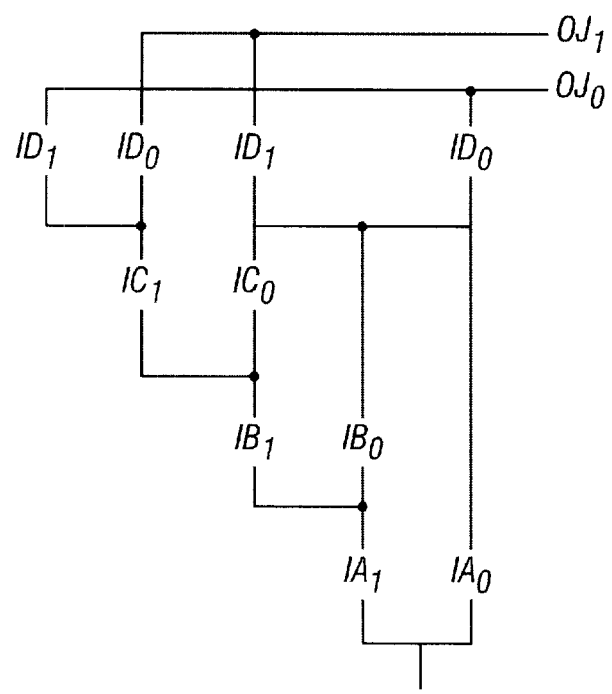
Figure 41:
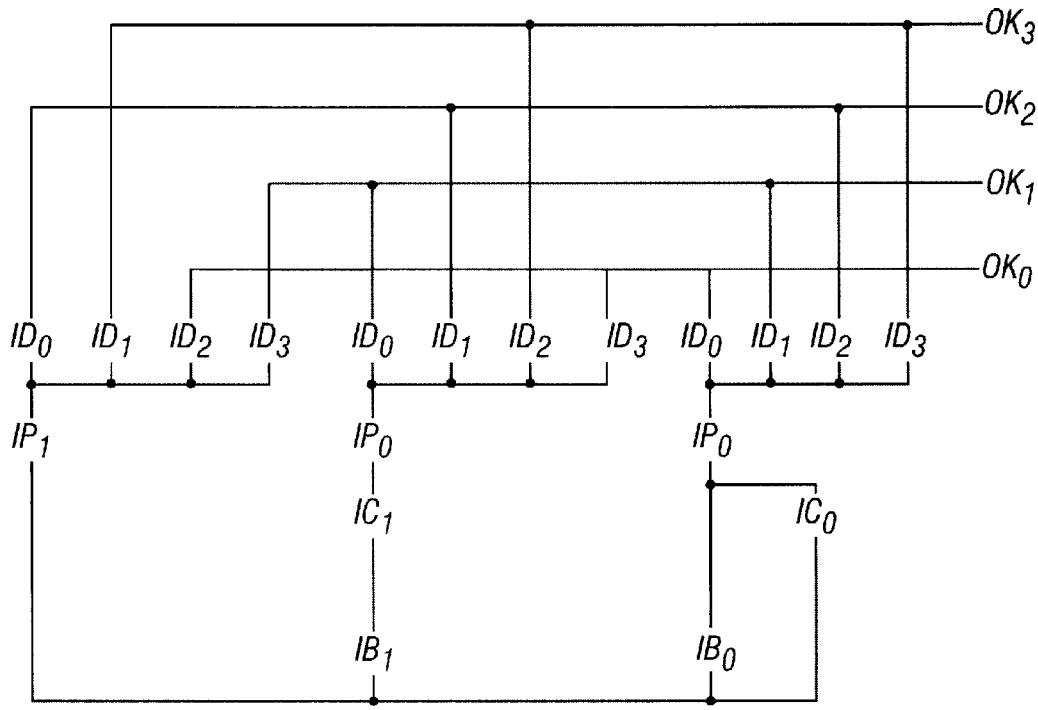
Figure 42:
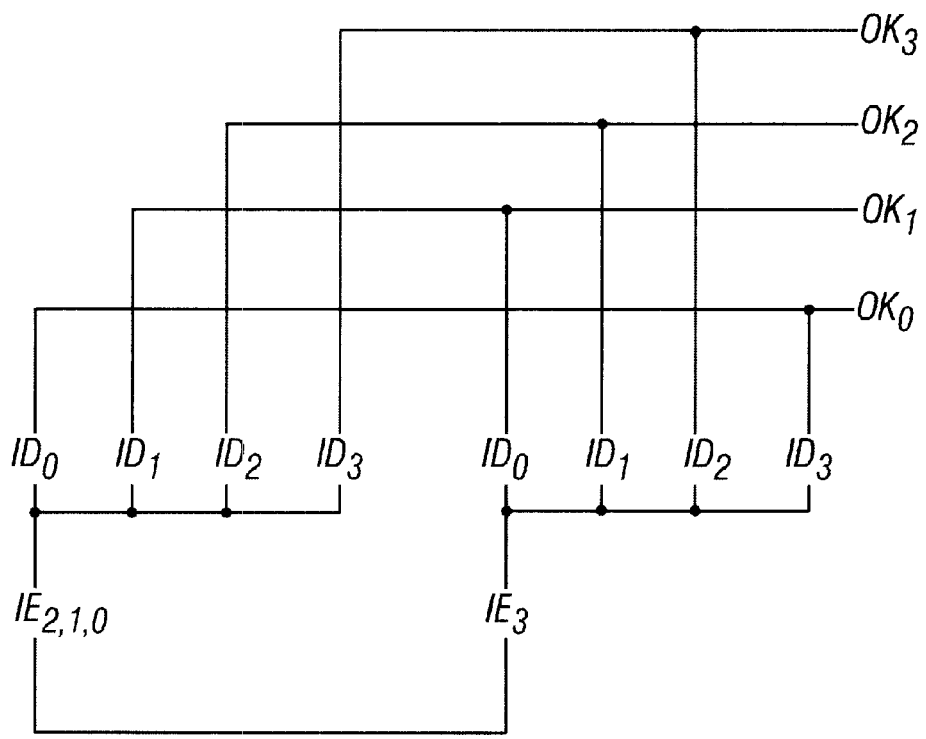
Figure 43:
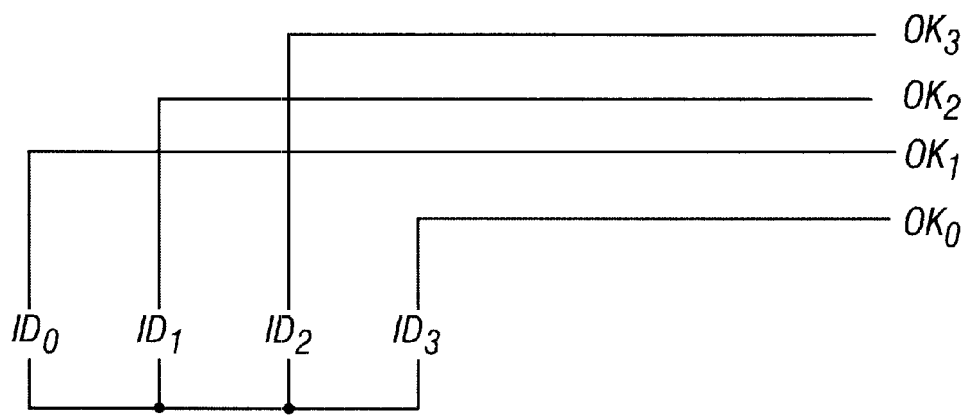

| | Gate/FIG# | | | | | | | | |
|---|---|---|---|---|---|---|---|---|---|
| Input Signal | 2a FIG. 10 49:34 | 2b FIG. 11 41:34 | 2c FIG. 12 33:10 | 2d FIG. 12 31:10 | 2e FIG. 13 25:5 | 2f FIG. 14 17:5 | 2g FIG. 15 9:5 | 2h FIG. 16 9:1 | 2i FIG. 17 4:1 |
| IA | 1c 53:46 | 1c 53:46 | 1m 29:22 | 1m 29:22 | 1o 21:17 | 1o 21:17 | 1o 21:17 | 1o 21:17 | 1s 16:13 |
| IB | 1d 49:42 | 1d 49:42 | 1n 25:18 | 1n 25:18 | 1q 17:13 | 1q 17:13 | 1q 17:13 | 1q 17:13 | 1u 12:9 |
| IC | 1e 45:38 | 1e 45:38 | 1p 21:14 | 1p 21:14 | 1t 13:9 | 1t 13:9 | 1t 13:9 | 1t 13:9 | 1w 8:5 |
| ID | 1g 41:34 | 1g 41:34 | 1r 17:10 | 1r 17:10 | 1v 9:5 | 1v 9:5 | 1v 9:5 | 1v 9:5 | 1x 4:1 |
| IE | 1a 61:54 | — | 1i 37:30 | 1i 37:30 | 1m 29:22 | 1m 29:22 | — | 1s 16:13 | — |
| IF | 1b 57:50 | — | 1k 33:26 | 1k 33:26 | 1n 25:18 | 1n 25:18 | — | 1u 12:9 | — |
| IG | 1c 53:46 | — | 1m 29:22 | 1m 29:22 | 1p 21:14 | 1p 21:14 | — | 1w 8:5 | — |
| IH | 1d 49:42 | — | 1n 25:18 | 1n 25:18 | 1r 17:10 | 1r 17:10 | — | 1x 4:1 | — |
| II | — | — | 1e 45:38 | 1f 43:38 | 1i 37:30 | — | — | — | — |
| IJ | — | — | 1g 41:34 | 1h 39:34 | 1k 33:26 | — | — | — | — |
| IK | — | — | 1i 37:30 | 1j 35:30 | 1m 29:22 | — | — | — | — |
| IL | — | — | 1k 33:26 | 1l 31:26 | 1n 25:18 | — | — | — | — |

As described above, level 2 1-of-3 output signals (designated OA in Table 3 and FIGS. 10–14) are defined as $OA_2$ asserted when all bits within the bit block represented by the output signal are one, $OA_1$ asserted when the top four bits of the bit block represented are not all one, but the remaining bits are all one, and $OA_0$ asserted for all other patterns. The Level 2 1-of-2 output signal from gate 2g (designated OB in Table 3 and FIG. 15) is defined as $OB_1$ asserted when all bits within the bit block represented by the gate output signal are one, $OB_0$ asserted for all other patterns. The Level 2 1-of-6 output signal from gate 2h (designated OD in Table 3 and FIG. 16) is defined as follows:

TABLE 7

Level 2 1-of-6 Output Signal Definitions

| OD Output Wire asserted | corresponding data pattern in 9-bit block |
|---|---|
| $OD_5$ | 111111111 |
| $OD_4$ | 111111110 |
| $OD_3$ | 11111110X |
| $OD_2$ | 1111110XX |
| $OD_1$ | 111110XXX |
| $OD_0$ | else XXXX | where "X" represents a "don't care" condition.

The Level 2 1-of-5 output signal from gate 2i is defined the same as the 1-of-5 output signal of the Level 1 gate shown in FIG. 9 As in the Level 1 logic described above, the five gate output wires ($OC_4$, $OC_3$, $OC_2$, $OC_1$ and $OC_0$) represent five possible data patterns within a 4-bit block.

Level 3A Logic

Level 3A in the rounding anticipator of the present invention produces carry propagate information by processing data obtained from the medium shift output and by further processing and combining propagate data obtained from Level 2. Propagate information is grouped into block sizes which are a maximum of 21-bits. Level 3A outputs are either 1-of-3 or 1-of-2 signals. Level 3A outputs are supplied to the final rounding anticipator logic level (Level 4) and as described below, represent the propagate block "middle bits" for a given Level 4 output dit.

As the reader will recall, the output data size of the medium shifter in the normalizer is 58 bits wide and the output of Level 2 in the rounding anticipator is propagation information for selected groups of bits within these 58 bits. The rounding anticipator must be capable of determining the increment position of the normalized result for both single- and double-precision operations. Therefore, the level 3A logic must account for potential increment positions for both single- and double-precision operations when selecting the appropriate bit block sizes for which propagation information will be further processed. Table 8 shows the bit ranges of a 58-bit medium shift output that will always participate in a single precision normalized and incremented result, as function of the fine shift select signal. In other words, if the fine shift select signal is shift-0 bits, then the top 24 bits of the 58-bit medium shift output (bits 57:34) will be selected by the normalizer as the normalized (but unrounded) mantissa of the single precision intermediate result. If the fine shift select signal is shift-1 bit, then the top bit of the 58-bit medium shift output will be discarded and the next 24 bits (bits 56:33) will be the mantissa of the normalized, unrounded single precision intermediate result.

Table 8 also shows the bits of the medium shift output that will always participate in the normalized intermediate result of double precision operations. For example, if the fine shift select signal is shift-0 bits, then the mantissa of the normalized, unrounded double precision intermediate result will be the top 53 bits of the medium shift output (bits 57:5). Table 8 shows the extra bits that will participate in the intermediate results for double-precision operations, designated as "non-SP region," for each of the five possible fine shift select choices.

TABLE 8

Medium Shift Output Bits Included in Single-Precision Mantissas

| Fine Shift Select | 24-bit Single Precision Region | Non-SP Region |
|---|---|---|
| 0-bits | 57:34 | 33:5 |
| 1 bit | 56:33 | 32:4 |
| 2-bits | 55:32 | 31:3 |
| 3-bits | 54:31 | 30:2 |
| 4-bits | 53:30 | 29:1 |

Table 8 shows that medium shift output bit 34 always participates in single precision normalized mantissa (but unrounded) intermediate results. Therefore, bit 34 is used as the lower boundary for propagation ranges which affect single precision results.

Table 9 summarizes the outputs of the 13 Level 3A gates and the medium shift output bit ranges for which propagation information is being derived for the "middle bits" of a given Level 4 output result. Note that some Level 3A "gates" are simply buffers, through which propagation information represented by outputs from specific Level 2 gates is passed from Level 2 to Level 4.

TABLE 9

Level 3A Gates

| Gate Name | FIGURE Number | Medium shift output propagation range represented | Propagation Block Size (Bits) | Output Signal Type |
|---|---|---|---|---|
| 3Aa | 18 | 53:34 | 20 | OB: 1-of-2 |
| 3Ab | 19 | 51:34 | 18 | OB: 1-of-2 |
| 3Ac | 20 A (buffered Level 2 signal) | 49:34 | 16 | OA: 1-of-3 |
| 3Ad | 21 | 47:34 | 14 | OA: 1-of-3 |
| 3Ae | 20 A (buffered Level 2 signal) | 41:34 | 8 | OA: 1-of-3 |
| 3Af | 22 | 39:34 | 6 | OA: 1-of-3 |
| 3Ag | 20A (buffered Level 2 signal) | 25:5 | 21 | OA: 1-of-3 |
| 3Ah | 21 | 23:5 | 19 | OA: 1-of-3 |
| 3Ai | 20A (buffered Level 2 signal) | 17:5 | 13 | OA: 1-of-3 |
| 3Aj | 23 | 15:5 | 11 | OA: 1-of-3 |
| 3Ak | 20B (buffered Level 2 signal) | 9:5 | 5 | OB: 1-of-2 |
| 3Al | 24 | 7:5 | 3 | OB: 1-of-2 |
| 3Am | 25 | 5 | 1 | OB: 1-of-2 |

The Level 3A outputs are either 1-of-3 signals (designated OA) or 1-of-2 signals (designated OB). As in Levels 1 and 2, $OA_2$ is asserted when all bits within the bit block represented by the output signal are one, $OA_1$ is asserted when the top four bits of the bit block represented are not all one, but the remaining bits are all one, and $OA_0$ is asserted for all other patterns. Likewise, as in Levels 1 and 2, $OB_1$ is asserted when all bits within the bit block represented by the gate output signal are one, and $OB_0$ is asserted for all other patterns.

Table 10 provides the source for the Level 3A gate input signals shown in the Level 3A gates shown in FIGS. 18–25. Except for those gates whose output is a buffered Level 2 signal, each Level 3A gate combines propagation information from level 2 with medium shift output dits to produce an output signal that encodes propagation information for the medium shift output ranges shown in Table 9.

TABLE 10

Level 2 source gates for Level 3A gate input signals

Figure 18:
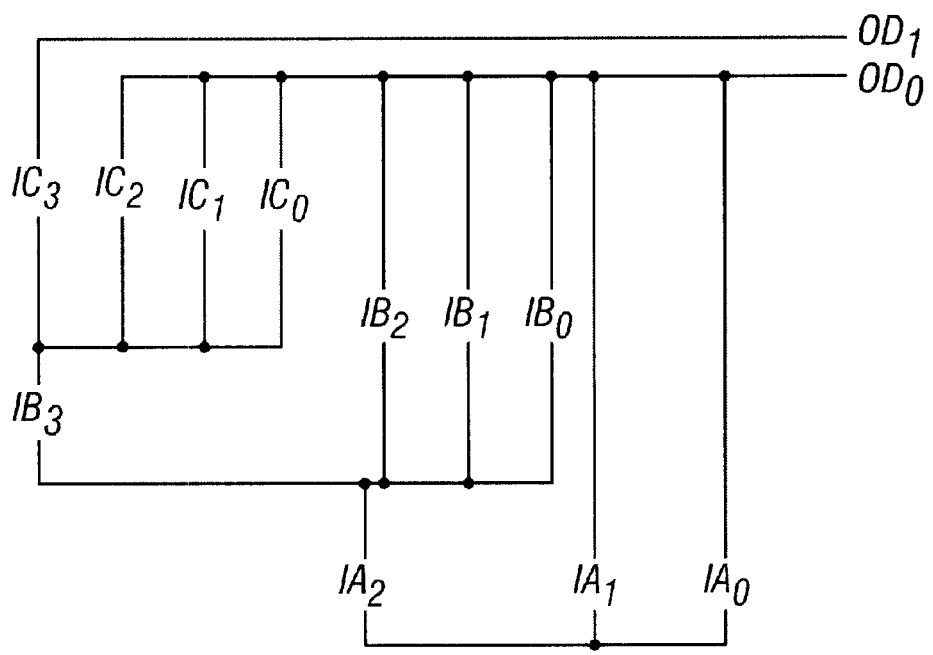
Figure 19:
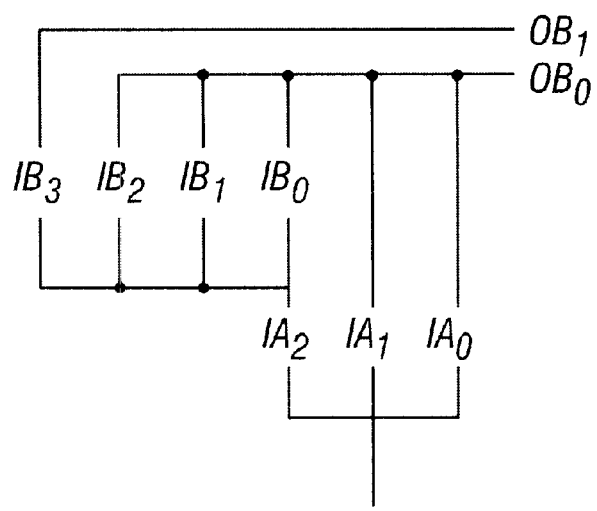
Figure 22:
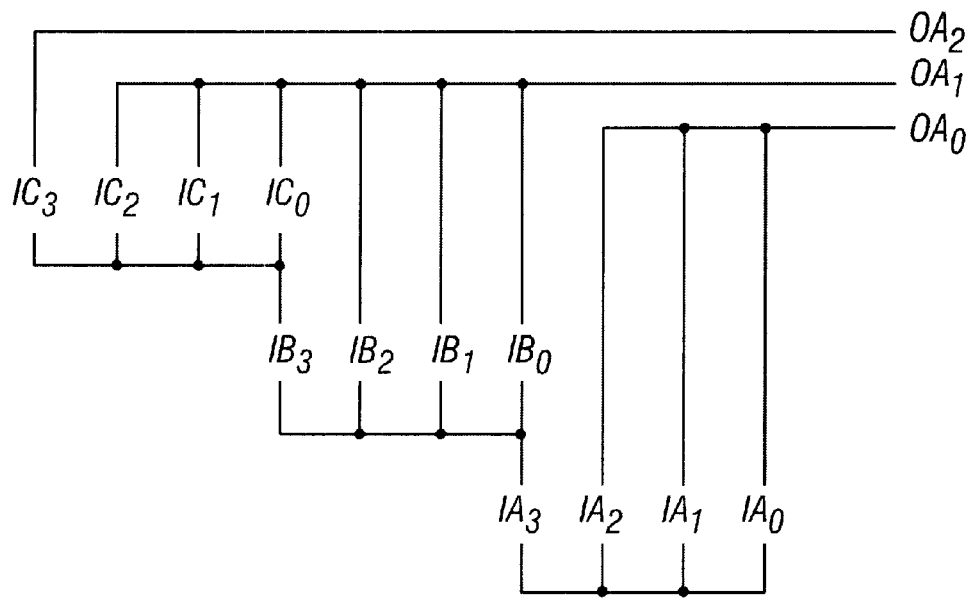
Figure 23:
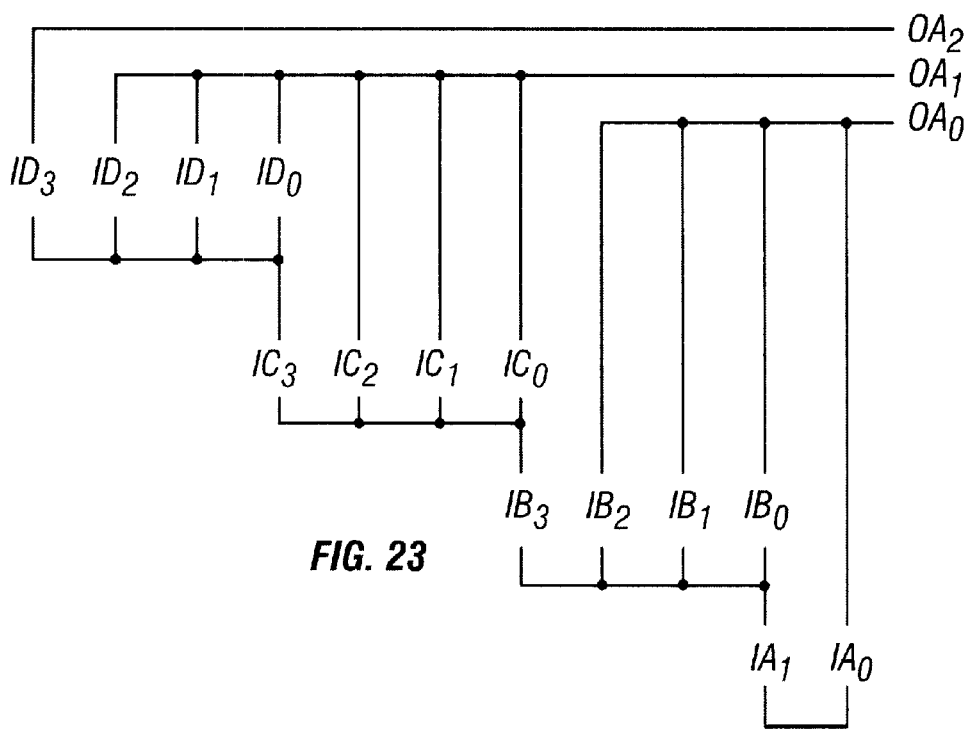
Figure 24:
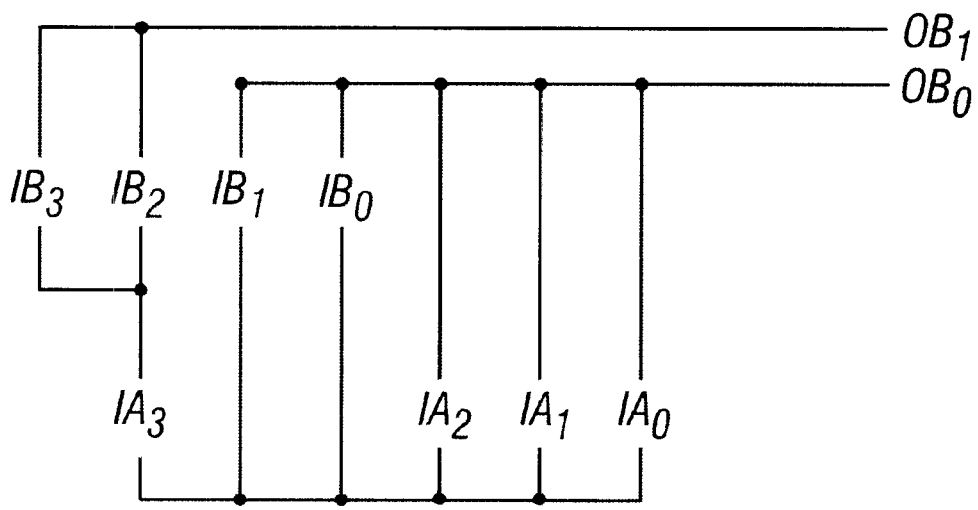
Figure 39:
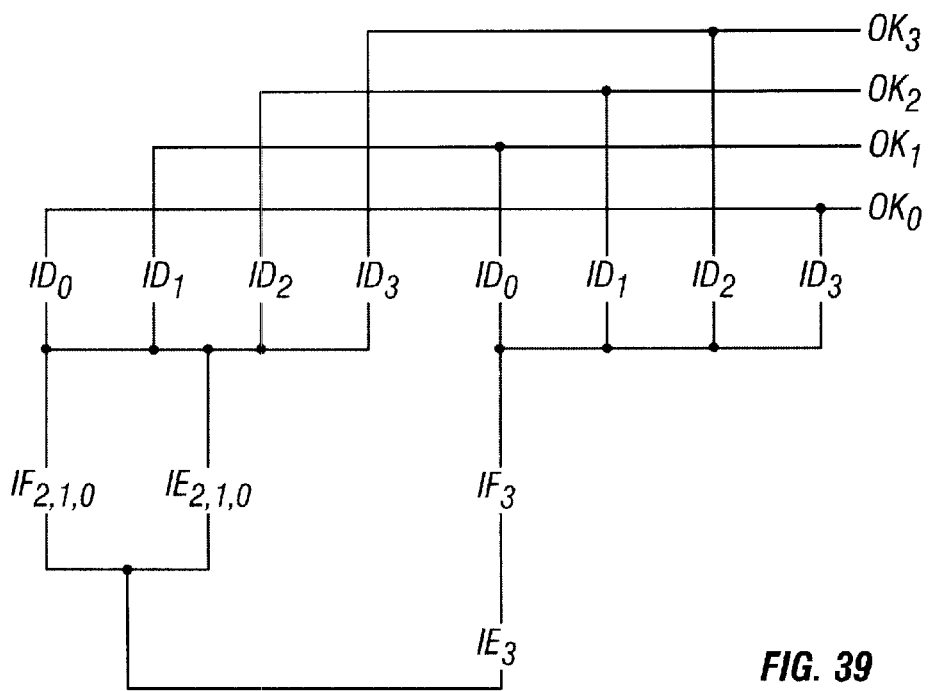

| Input Signal | Gate/FIG # | | | | | | | | | | | | |
|---|---|---|---|---|---|---|---|---|---|---|---|---|---|
| | 3Aa FIG. 18 53:34 | 3Ab FIG. 19 51:34 | 3Ac FIG. 20A 49:34 | 3Ad FIG. 21 47:34 | 3Ae FIG. 20A 41:34 | 3Af FIG. 22 39:34 | 3Ag FIG. 20A 25:5 | 3Ah FIG. 21 23:5 | 3Ai FIG. 20A 17:5 | 3Aj FIG. 23 15:5 | 3Ak FIG. 20B 9:5 | 3Al FIG. 24 7:5 | 3Am FIG. 25 5 |
| IA | 2a 49:34 | 2a 49:34 | 2a 49:34 | 2b 41:34 | 2b 41:34 | med shift output 35:34 | 2e 25:5 | 2f 17:5 | 2f 17:5 | 2g 9:5 | 2g 9:5 | med shift output 7:6 | med shift output 5:4 |

TABLE 10-continued

Level 2 source gates for Level 3A gate input signals

| | Gate/FIG # | | | | | | | | | | | | |
|---|---|---|---|---|---|---|---|---|---|---|---|---|---|
| Input Signal | 3Aa FIG. 18 53:34 | 3Ab FIG. 19 51:34 | 3Ac FIG. 20A 49:34 | 3Ad FIG. 21 47:34 | 3Ae FIG. 20A 41:34 | 3Af FIG. 22 39:34 | 3Ag FIG. 20A 25:5 | 3Ah FIG. 21 23:5 | 3Ai FIG. 20A 17:5 | 3Aj FIG. 23 15:5 | 3Ak FIG. 20B 9:5 | 3Al FIG. 24 7:5 | 3Am FIG. 25 5 |
| IB | med shift output 51:50 | med shift output 51:50 | — | med shift output 43:42 | — | med shift output 37:36 | — | med shift output 19:18 | — | med shift output 11:10 | — | med shift output 5:4 | — |
| IC | med shift output 53:52 | — | — | med shift output 45:44 | — | med shift output 39:38 | — | med shift output 21:20 | — | med shift output 13:12 | — | — | — |
| ID | — | — | — | med shift output 47:46 | — | — | — | med shift output 23:22 | — | med shift output 15:14 | — | — | — |

Level 3B Logic

Level 3B produces carry propagate information by processing data obtained from the medium shift output and qualifying it with the fine shift select signal. Propagate information is grouped into block sizes which are a maximum of 5-bits. Level 3B outputs are 1-of-2 signals. Level 3B outputs are supplied to the final rounding anticipator logic level (Level 4) and represent the propagate block "top bits" for a given Level 4 output.

The Level 3B 1-of-2 output signals are different from the 1-of-2 output signals in the previous levels. The Level 3B 1-of-2 output signals, designated as OE, are formed by two gate output wires $E_1$ and $E_0$. A shorthand representation of the encoding of $OE_1$ and $OE_0$ is as follows:

$OE_1$:
  (b'11111' and fine shift select 0-bits) or
  (b'X1111' and fine shift select 1-bits) or
  (b'XX111' and fine shift select 2-bits) or
  (b'XXX11' and fine shift select 3-bits) or
  (b'XXXX1' and fine shift select 4-bits)

$OE_0$: else

Figure 26:
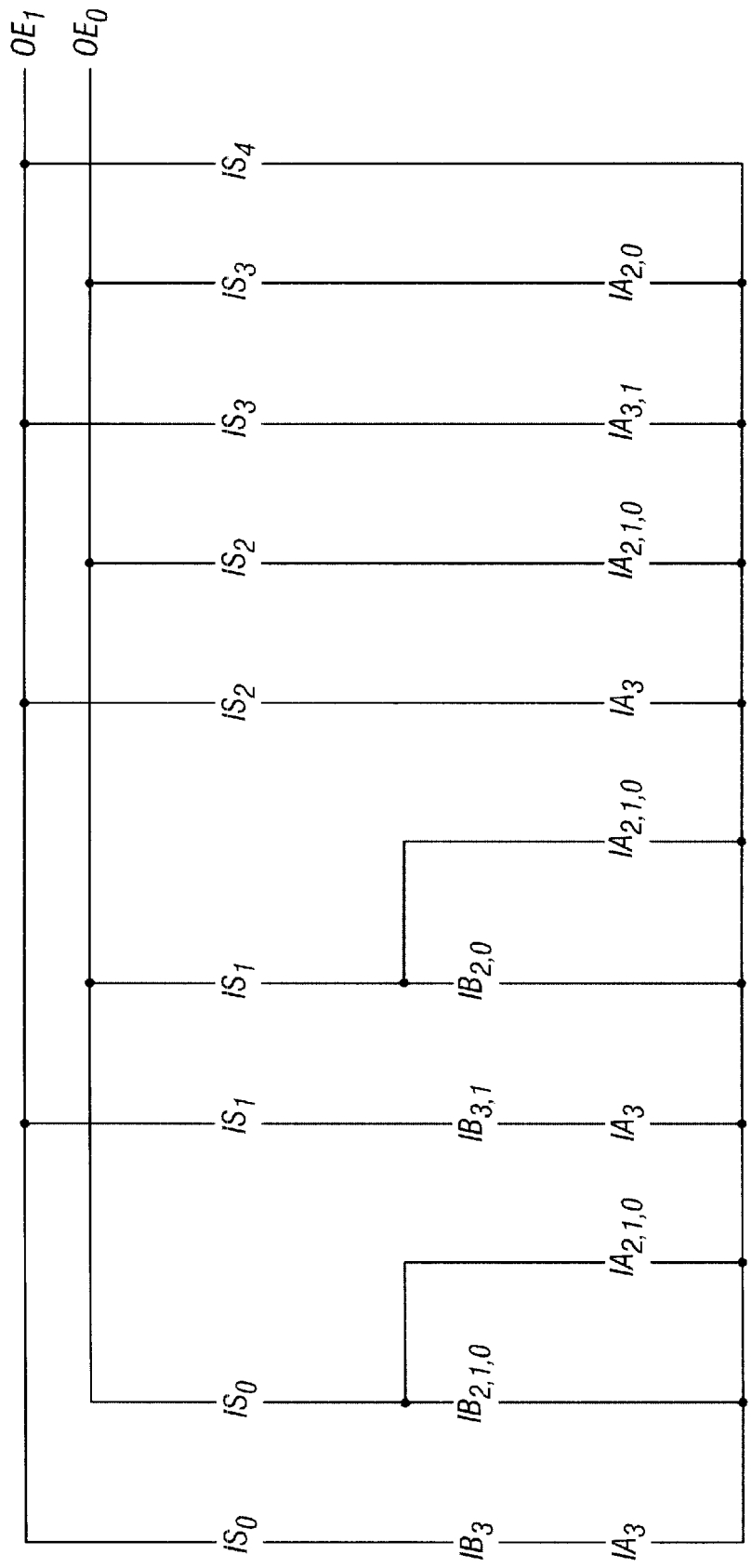
FIGS. 26 and 27 show shorthand representations of the two different types of Level 3B N-NARY gates, according to one embodiment of the present invention.
Figure 27:
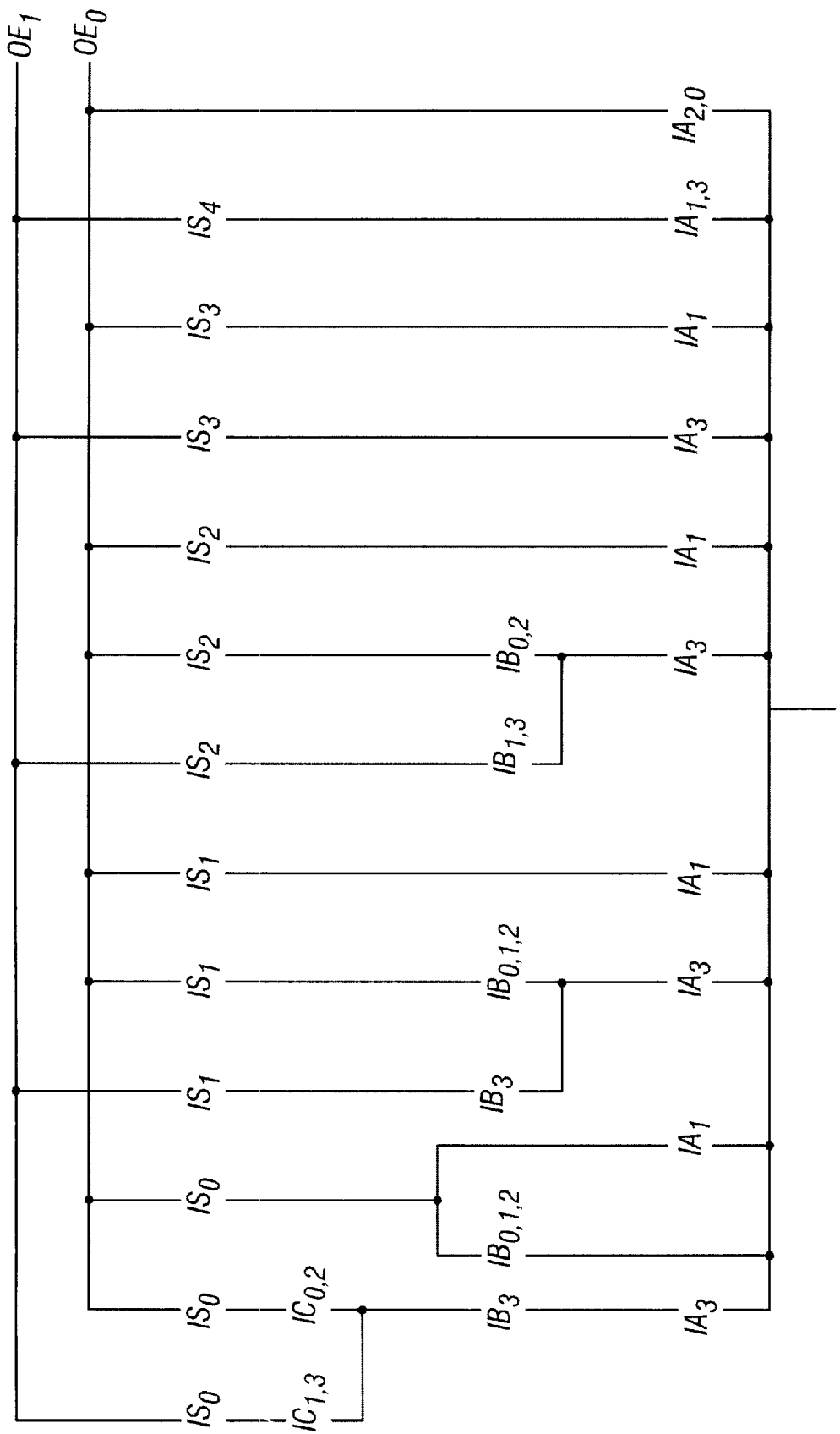

FIGS. 26 and 27 are shorthand representations of the Level 3B 1-of-2 N-NARY gates. FIG. 26 shows Level 3B gate 3Ba, and FIG. 27 shows Level 3B gates 3Bb through 3By. Each Level 3B gate receives three 1-of-4 input signals (IA, IB and IC), where each signal represents medium shift output data dits. The 1-of-5 input signal IS represents the fine shift select signal ($IS_0$: shift 0-bits, $IS_1$: shift 1-bit, $IS_2$: shift 2-bits, $IS_3$: shift 3-bits, $IS_4$: shift 4-bits). The output OE of each gate propagation information for the 4- or 5-bit block within the medium shift output bit range designated for each gate in Table 11 below. Table 11 also identifies which medium shift output bits are represented by gate input signals IA, IB, and IC.

TABLE 11

Level 3B gates.

| Gate Name | Figure Number | Medium shift output propagation range represented | IA | IB | IC | Propagation Block Size (Bits) | Output Signal Type |
|---|---|---|---|---|---|---|---|
| 3Ba | 26 | 57:54 | 55:54 | 57:56 | — | 4 | OE: 1-of-2 |
| 3Bb | 27 | 56:52 | 53:52 | 55:54 | 57:56 | 5 | OE: 1-of-2 |
| 3Bc | 27 | 54:50 | 51:50 | 53:52 | 55:54 | 5 | OE: 1-of-2 |
| 3Bd | 27 | 52:48 | 49:48 | 51:50 | 53:52 | 5 | OE: 1-of-2 |
| 3Be | 27 | 50:46 | 47:46 | 49:48 | 51:50 | 5 | OE: 1-of-2 |
| 3Bf | 27 | 48:44 | 45:44 | 47:46 | 49:48 | 5 | OE: 1-of-2 |
| 3Bg | 27 | 46:42 | 43:42 | 45:44 | 47:46 | 5 | OE: 1-of-2 |
| 3Bh | 27 | 44:40 | 41:40 | 43:42 | 45:44 | 5 | OE: 1-of-2 |
| 3Bi | 27 | 42:38 | 39:38 | 41:40 | 43:42 | 5 | OE: 1-of-2 |
| 3Bj | 27 | 40:36 | 37:36 | 39:38 | 41:40 | 5 | OE: 1-of-2 |
| 3Bk | 27 | 38:34 | 35:34 | 37:36 | 39:38 | 5 | OE: 1-of-2 |
| 3Bl | 27 | 36:32 | 33:32 | 35:34 | 37:36 | 5 | OE: 1-of-2 |
| 3Bm | 27 | 34:30 | 31:30 | 33:32 | 35:34 | 5 | OE: 1-of-2 |
| 3Bn | 27 | 32:28 | 29:28 | 31:30 | 33:32 | 5 | OE: 1-of-2 |
| 3Bo | 27 | 30:26 | 27:26 | 29:28 | 31:30 | 5 | OE: 1-of-2 |
| 3Bp | 27 | 28:24 | 25:24 | 27:26 | 29:28 | 5 | OE: 1-of-2 |
| 3Bq | 27 | 26:22 | 23:22 | 25:24 | 27:26 | 5 | OE: 1-of-2 |
| 3Br | 27 | 24:20 | 21:20 | 23:22 | 25:24 | 5 | OE: 1-of-2 |
| 3Bs | 27 | 22:18 | 19:18 | 21:20 | 23:22 | 5 | OE: 1-of-2 |
| 3Bt | 27 | 20:16 | 17:16 | 19:18 | 21:20 | 5 | OE: 1-of-2 |
| 3Bu | 27 | 18:14 | 15:14 | 17:16 | 19:18 | 5 | OE: 1-of-2 |
| 3Bv | 27 | 16:12 | 13:12 | 15:14 | 17:16 | 5 | OE: 1-of-2 |
| 3Bw | 27 | 14:10 | 11:10 | 13:12 | 15:14 | 5 | OE: 1-of-2 |

TABLE 11-continued

Level 3B gates.

| Gate Name | Figure Number | Medium shift output propagation range represented | IA | IB | IC | Propagation Block Size (Bits) | Output Signal Type |
|---|---|---|---|---|---|---|---|
| 3Bx | 27 | 12:8 | 9:8 | 11:10 | 13:12 | 5 | OE: 1-of-2 |
| 3By | 27 | 10:6 | 7:6 | 9:8 | 11:10 | 5 | OE: 1-of-2 |

Level 3C Logic

Level 3C produces carry propagate information by processing data obtained from the medium shift output and Level 2 and qualifying it with the fine shift select signal and the increment position signal as appropriate. Propagate information is grouped into block sizes which are a maximum of 33-bits. Level 3C outputs are 1-of-2 signals, designated as either OF or OG. Level 3C outputs are supplied to the final rounding anticipator logic level (Level 4) and represent the propagate block "bottom bits" for a given Level 4 output dit.

Figure 28:
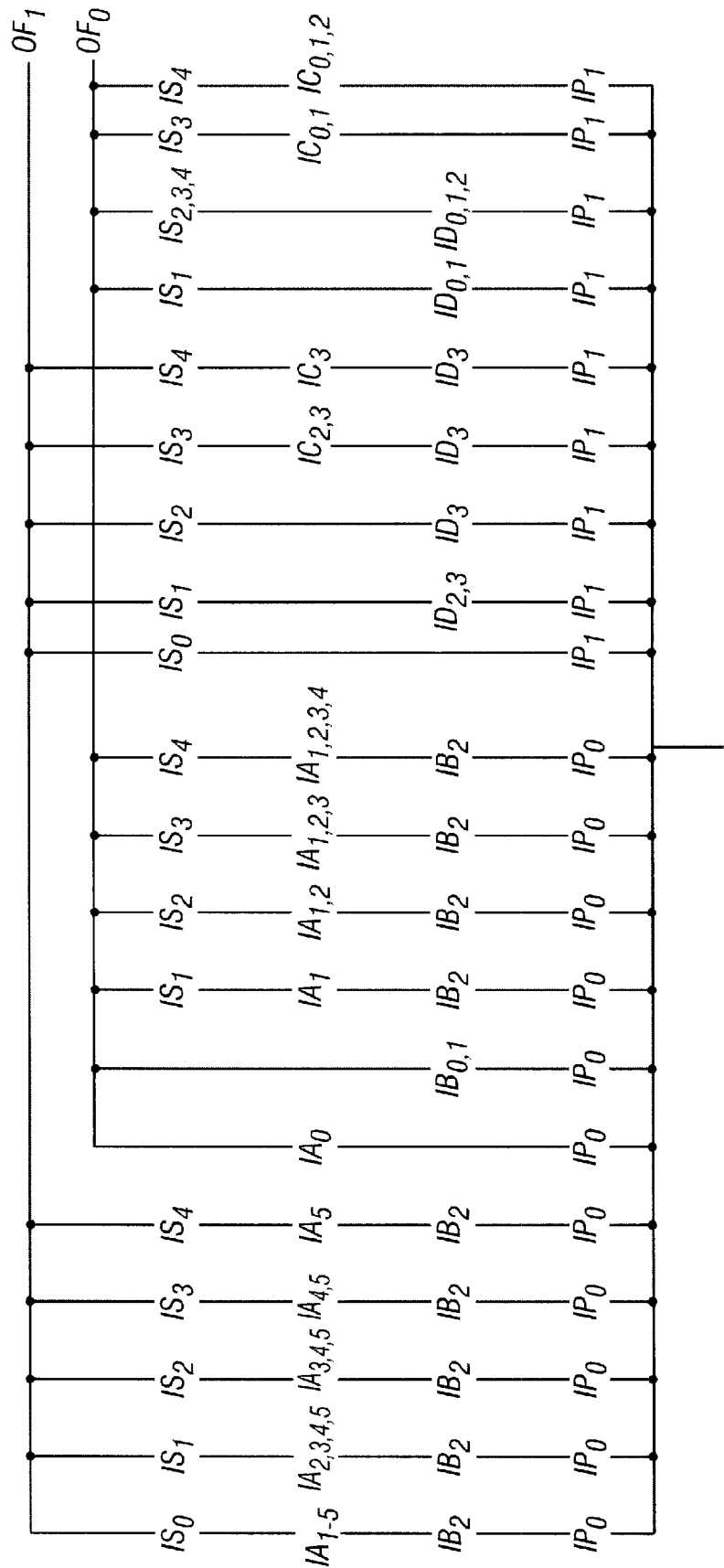
FIGS. 28–31 show shorthand representations of the four Level 3C N-NARY gates, according to one embodiment of the present invention.

FIGS. 28 through 32 each show one embodiment of each of the five Level 3C gates. Information about the Level 3C gate input signal sources, output signals, and propagate blocks represented is summarized in Table 12 below. As shown in FIG. 28 and Table 12, the 1-of-2 output signal OF of Level 3C gate 3Ca represents propagate information for bits 33:1 of the medium shift output. Signal OF represents two possible data patterns within bits 33:1 as a function of the increment position signal. The increment position signal, a 1-of-2 signal designated IP in FIG. 28 and Table 12, encodes whether the operation being performed is a double precision operation ($IP_0$ asserted) or a single precision operation ($IP_1$ asserted).

Figure 29:
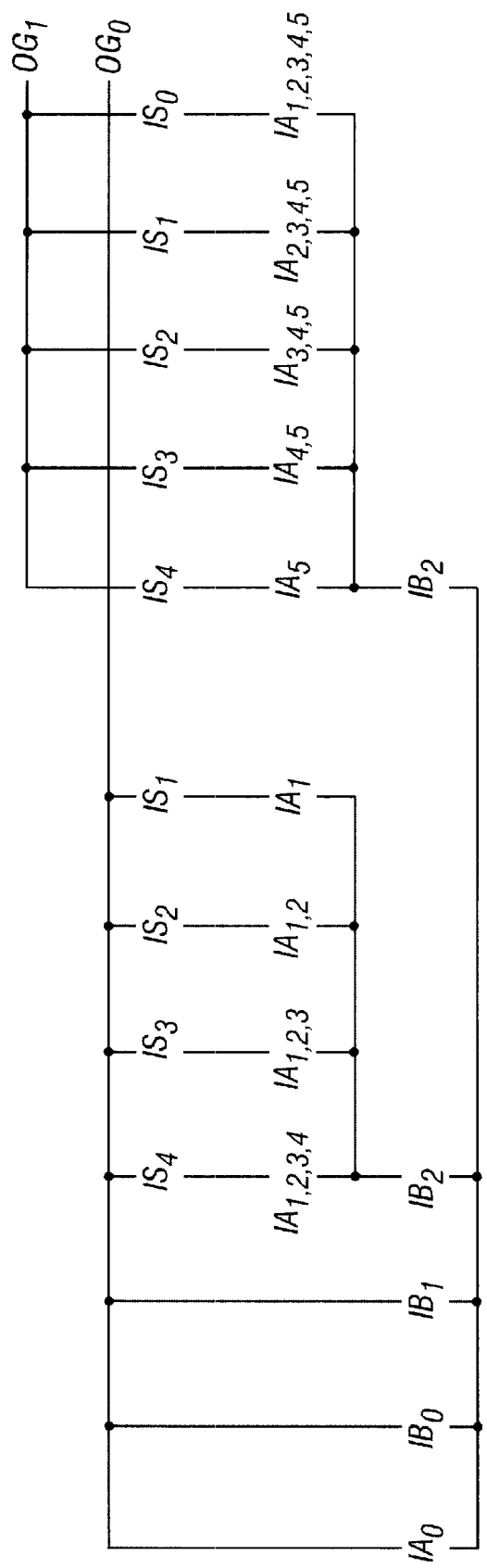
Figure 30:
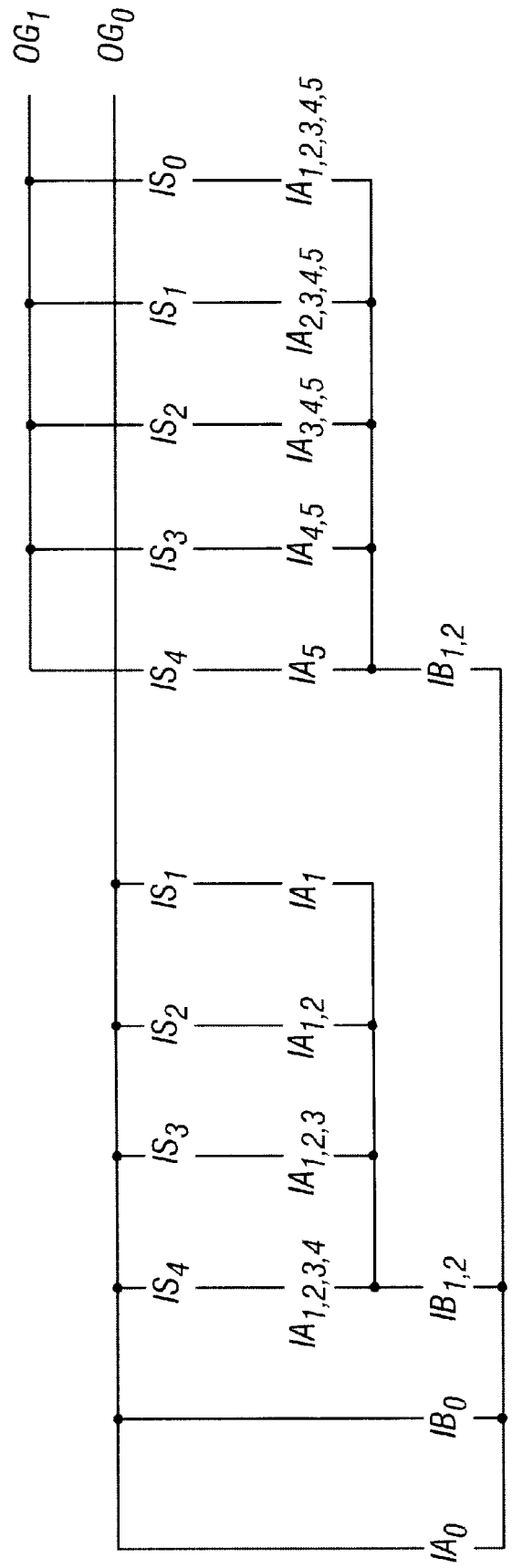

Output signal OF of gate 3Ca is defined as follows: If increment position signal indicates double precision ($IP_0$ asserted) then:

$OF_1$:
(bits 33:5=b'1 . . . 1' and fine shift select=shift 0-bits) or
(bits 33:4=b'1 . . . 1' and fine shift select=shift 1-bit) or
(bits 33:3=b'1 . . . 1' and fine shift select=shift 2-bits) or
(bits 33:2=b'1 . . . 1' and fine shift select=shift 3-bits) or
(bits 33:1=b'1 . . . 1' and fine shift select=shift 4-bits)
$OF_0$: else If increment position signal indicates single ($IP_1$ asserted) precision then:

$OF_1$:
(b'X . . . X' and fine shift select=shift 0-bits) or
(bits 33=b'1' and fine shift select=shift 1-bit) or
(bits 33:32=b'11' and fine shift select=shift 2-bits) or
(bits 33:31 b'111' and fine shift select=shift 3-bits) or
(bits 33:30 b'1111' and fine shift select=shift 4-bits)
$OF_0$: else The output of gates 3Cb through 3Ce, shown in FIGS. 29 through 31, is a 1-of-2 output signal OG. In gates 3Cb through 3Ce, $OG_1$ is asserted when all bits within the propagation block represented are 1, except that the i least significant bits are effectively "don't care," where i=4−fine shift select.

For example, in Gate 3Cb, $OG_1$ is asserted when the fine shift select signal=shift 0-bits, bits 31:5 are all 1's, and bits 4:1=b'XXXX'. Similarly, $OG_1$ is asserted when the fine shift select=shift 1-bit, bits 31:4 are all 1's, and bits 3:1=b'XXX', and so on. $OG_0$ is asserted for all other patterns within the propagation block represented by the output signal of the gate.

Those skilled in the art will recognize that the only output of Level 3C that is relevant to single precision operations is the output from gate 3Ca. As shown in Table 8, single precision results never utilize any medium shift output bit below bit 30. This is why the increment position signal is an input to gate 3Ca, but is not an input to any other level 3C gate. Similarly, this is why the definition of output signal OF depends upon the value of the increment position signal.

In Table 12 below, "MSO" stands for medium shift output, "FSS" stands for Fine Shift Select, "SP" stand for single precision, and "DP" stands for double precision.

TABLE 12

Level 3C Gates

| Gate Name | Fig. No. | Med. Shift Output Range Represented | Input Signal Sources | | | | | Propagation Block Size | Output Signal Name & Type |
| | | | IA | IB | IC | ID | IP | IS | |
|---|---|---|---|---|---|---|---|---|---|---|
| 3Ca | 28 | 33:1 (DP) 33:30 (SP) | 2h 9:1 | 2c 33:10 | MSO 31:30 | MSO 33:32 | 1 or 0 | FSS; 1-of-5 | 33 (DP) 4 (SP) | OF: 1-of-2 |
| 3Cb | 29 | 31:1 | 2h 9:1 | 2d 31:10 | — | — | — | FSS; 1-of-5 | 31 | OG: 1-of-2 |
| 3Cc | 30 | 29:1 | 2h 9:1 | 2c 33:10 | — | — | — | FSS; 1-of-5 | 29 | OG: 1-of-2 |
| 3Cd | 30 | 27:1 | 2h 9:1 | 2d 31:10 | — | — | — | FSS; 1-of-5 | 27 | OG: 1-of-2 |
| 3Ce | 31 | 4:1 | 2i 4:1 | — | — | — | — | FSS; 1-of-5 | 4 | OG: 1-of-2 |

Level 4 Logic

Level 4 produces the rounding anticipator output. Level 4 gates receive inputs from Level 3A, Level 3B, Level 3C, the fine shift output (normalized intermediate mantissa result) and where appropriate, the increment position signal. Level 4 outputs are either 1-of-2 output signals that represent one bit of the normalized and incremented intermediate result (signal names OH and OJ in FIGS. 32 and 33, respectively), or 1-of-4 signals that represent one dit of the normalized and incremented intermediate mantissa result (signal name OK in FIGS. 34–43). Single precision intermediate results are represented by result bits 52:29 (24-bits), while double precision intermediate results are represented by bits 52:0 (53-bits). Note that Level 4 output bits 5:0 can be formed directly by Level 4 gates without requiring any propagate information from previous levels.

In one embodiment, there are twelve different gate designs that combine to form the Level 4 logic of the present invention. FIGS. 32 through 43 are shorthand representations of the twelve different Level 4 gates. Table 13 identifies each Level 4 gate by gate type (FIG. No.), result bits represented by gate output signal, and the corresponding medium shift output bits as a function of the fine shift amount. Table 13 also shows the input signals for each Level 4 gate, by Level 3A, 3B, or 3C source gate and the medium shift propagation range represented by input signals IA, IB, and IC. Note that each gate except 4a also has an input signal ID, which represents the normalized but unincremented bit or bits of the fine shift output that correspond to the gate's output bit or bits. There is no input signal ID to gate 4a, because as shown in Table 13, the output of gate 4a is a carry out bit. As explained in further detail below, gates 4l and 4m have additional inputs IF and/or IE that represent the bottom bits of the fine shift output, which are used for incrementing single precision results.

Figure 34:
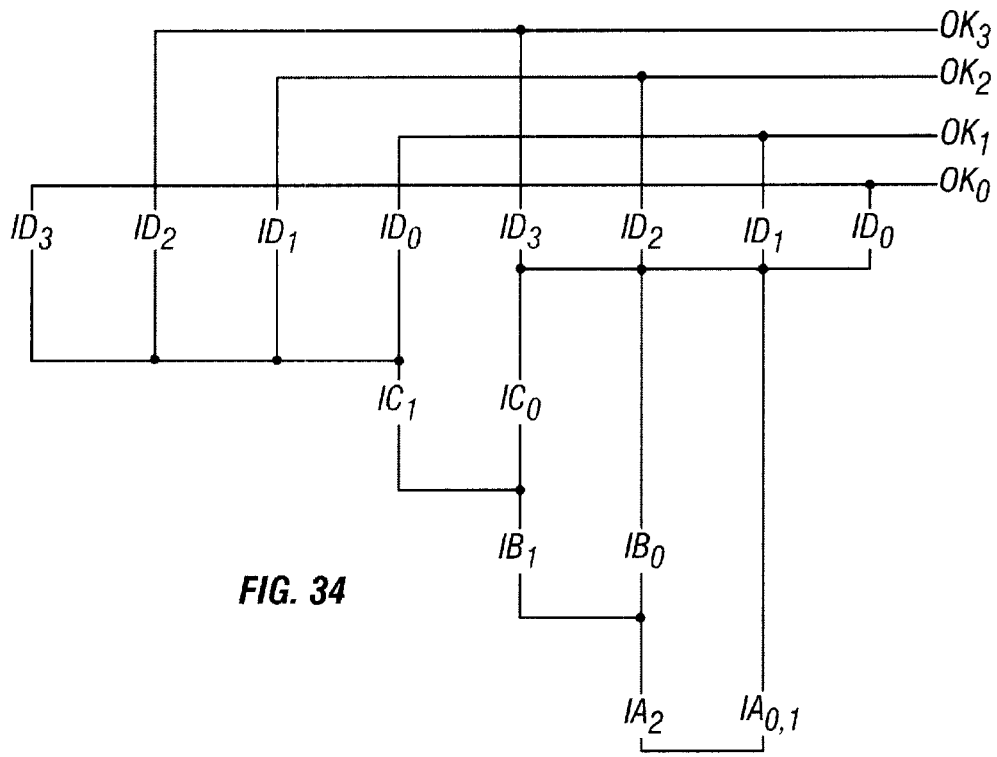
Figure 35:
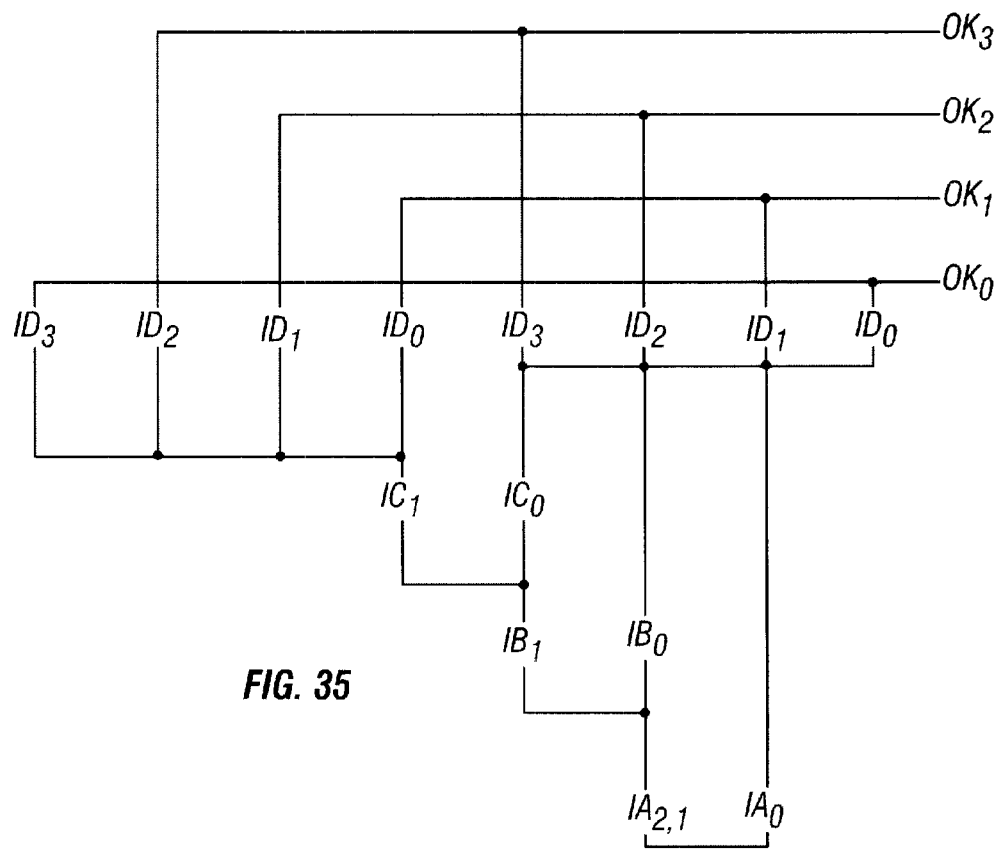
Figure 36:
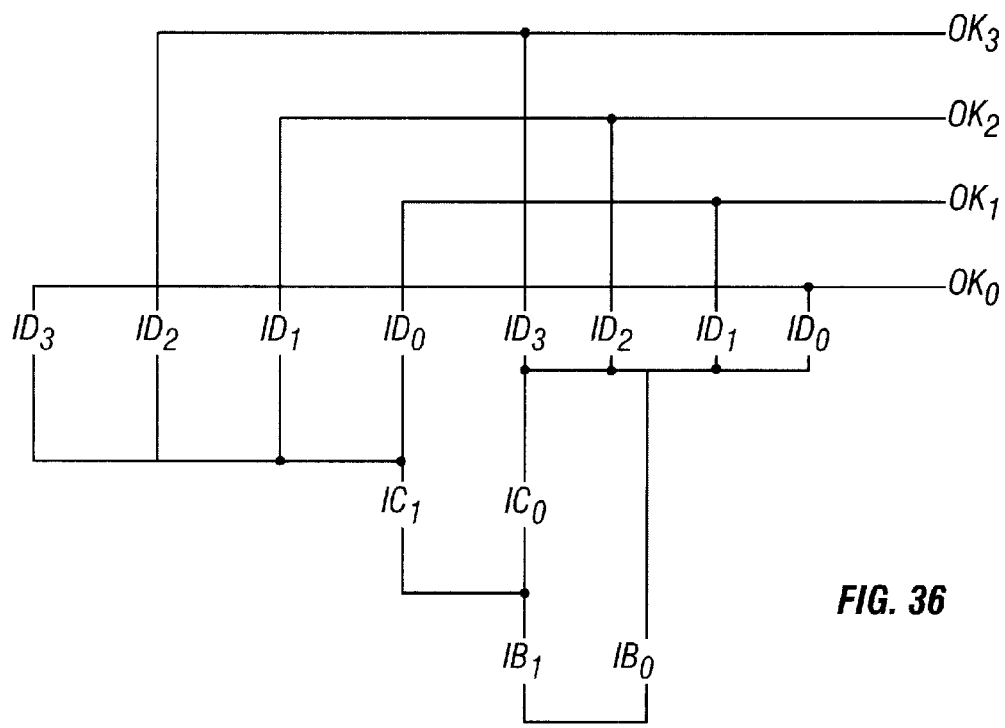

For example, Table 13 indicates that gate 4c is shown in FIG. 34. The output of gate 4c is OK, a 1-of-4 N-NARY signal that represents bits 51:50 of the incremented and normalized result of the present invention. When the fine shift select is shift-0, gate 4c's output bits correspond to medium shift output bits 56:55; when the fine shift select is shift-1, gate 4c's output bits correspond to medium shift output bits 55:54; when the fine shift select is shift-2, gate 4c's output bits correspond to medium shift output bits 54:53, and so on. The "top bits" where propagation results are relevant to the value of gate 4c's output bits are medium shift select bits 54:50; propagation information for these bits is encoded in the output of Level 3B, gate 3Bc. Therefore, the output of gate 3Bc is input signal IB to gate 4c. Likewise, the "middle bits" where propagation results are relevant to the value of gate 4c's output bits are medium shift select bits 49:34; propagation information for these bits is encoded in the output of Level 3A, gate 3Ac. Therefore, the output of gate 3Ac is input signal IA to gate 4c. Finally, the "bottom bits" where propagation results are relevant to the value of gate 4c's output bits are medium shift select bits 33:1; propagation information for these bits is encoded in the output of Level 3C, gate 3Ca. Therefore, the output of gate 3Ca is input signal IC to gate 4c. Input signal ID represents fine shift output data bits 51:50.

Figure 37:
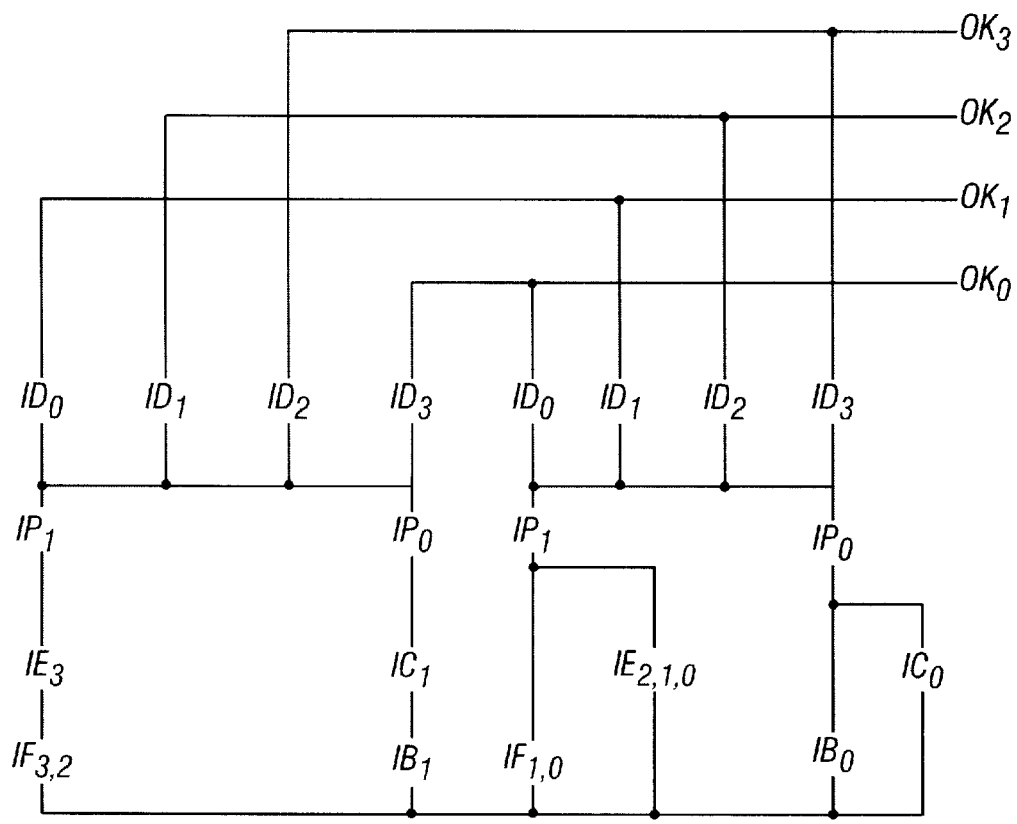
Figure 38:
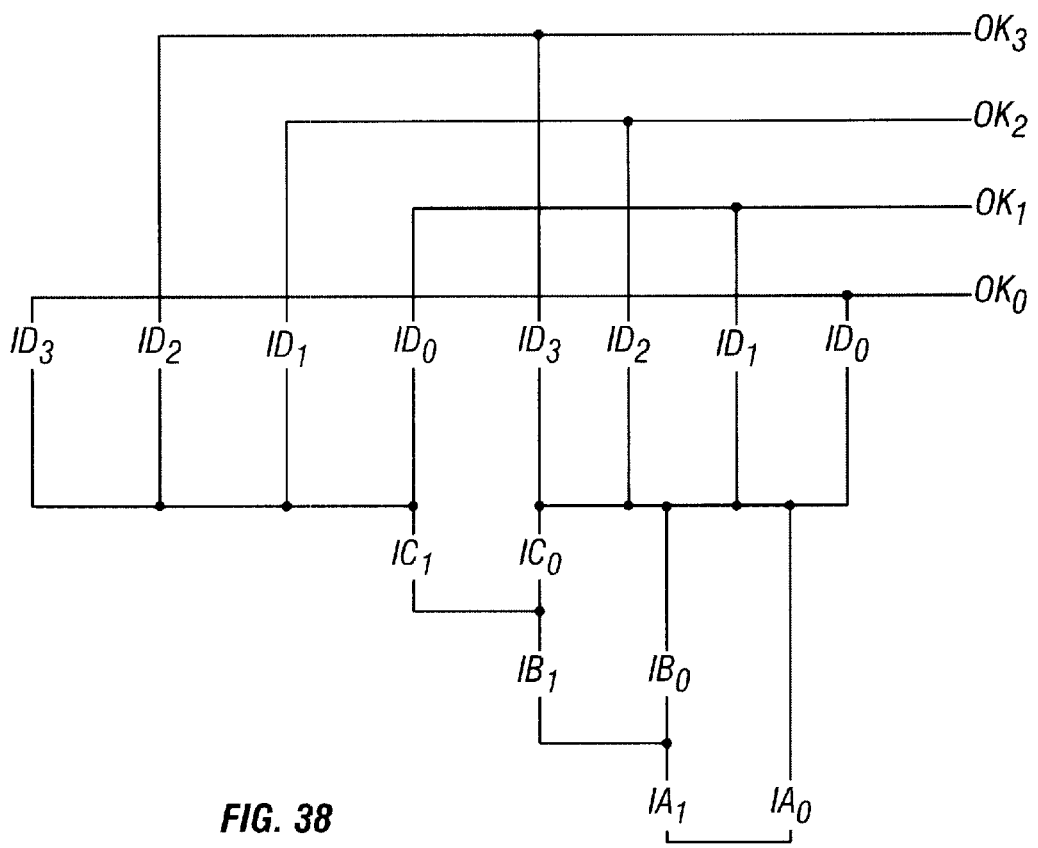

As shown in Table 13, gate 4i provides bits 33:32 of the result. In a single precision result, these bit positions must be incremented if incrementing bit 29 would propagate up to bits 33:32. Therefore, as shown in FIG. 37, gate 4l increments output dit 33:32 for single precision results when bits 29, 30, and 31 of the fine shift output (represented by inputs IE and IF to gate 4l) are all ones.

Figure 40:
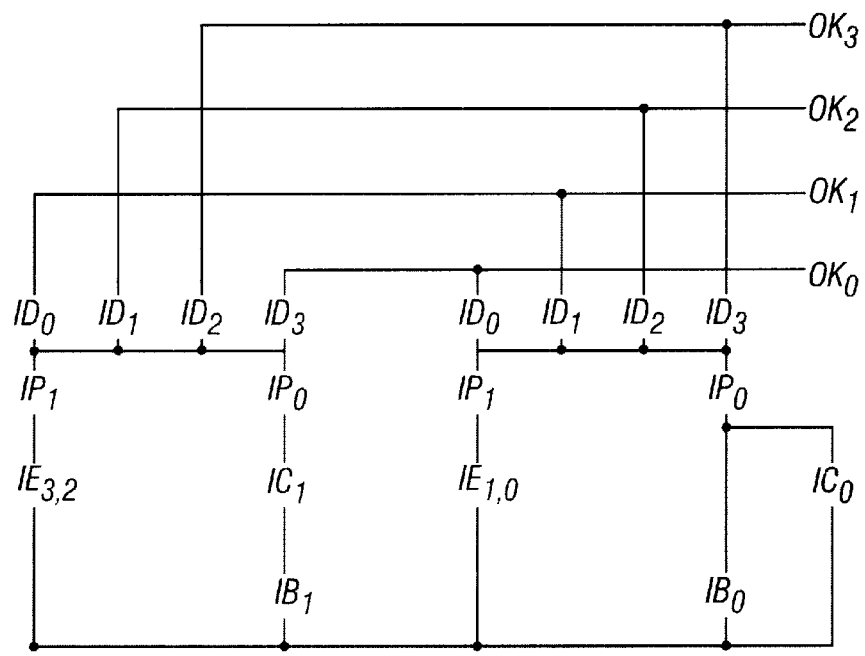

Similarly, gate 4m provides bits 31:30 of the result. In a single precision result, bits 31:30 must be incremented if incrementing bit 29 would propagate up. Therefore, as shown in FIG. 40, gate 4m increments dit 31:30 for single precision results when bit 29 (represented by input IE) is a 1. Finally, gate 4n provides bits 29:28 of the result. In single precision results Bit 29 is the increment position bit. Therefore, gate 4n, shown in FIG. 41, increments bit 29 for single precision results.

TABLE 13

Level 4 Gates

| Gate | Fig | Output bits | Corresponding Medium Shift Output Bits According to Fine Shift Select | | | | | IB (med. shift top bits) prop info & source | IA (med. shift middle bits) prop info & source | IC (med. shift bottom bits) prop info & source | ID | IE | IF |
|---|---|---|---|---|---|---|---|---|---|---|---|---|---|
| | | | shift-0 | shift-1 | shift-2 | shift-3 | shift-4 | | | | | | |
| 4a | 32 | carry-out | — | — | — | — | — | 3Ba; 57:54 | 3Aa; 53:34 | 3Ca; 33:1 | — | — | — |
| 4b | 33 | 52 | 57 | 56 | 55 | 54 | 53 | 3Bb; 56:52 | 3Ab; 51:34 | 3Ca; 33:1 | 52 | — | — |
| 4c | 34 | 51:50 | 56:55 | 55:54 | 54:53 | 53:52 | 52:51 | 3Bc; 54:50 | 3Ac; 49:34 | 3Ca; 33:1 | 51:50 | — | — |
| 4d | 34 | 49:48 | 54:53 | 53:52 | 52:51 | 51:50 | 50:49 | 3Bd; 52:48 | 3Ad; 47:34 | 3Ca; 33:1 | 49:48 | — | — |
| 4e | 35 | 47:46 | 52:51 | 51:50 | 50:49 | 49:48 | 48:47 | 3Be; 50:46 | 3Ac; 45:34 | 3Ca; 33:1 | 47:46 | — | — |
| 4f | 35 | 45:44 | 50:49 | 49:48 | 48:47 | 47:46 | 46:45 | 3Bf; 48:44 | 3Ad; 43:34 | 3Ca; 33:1 | 45:44 | — | — |
| 4g | 34 | 43:42 | 48:47 | 47:46 | 46:45 | 45:44 | 44:43 | 3Bg; 46:42 | 3Ae; 41:34 | 3Ca; 33:1 | 43:42 | — | — |
| 4h | 34 | 41:40 | 46:45 | 45:44 | 44:43 | 43:42 | 42:41 | 3Bh; 44:40 | 3Af 39:34 | 3Ca; 33:1 | 41:40 | — | — |
| 4i | 35 | 39:38 | 44:43 | 43:42 | 42:41 | 41:40 | 40:39 | 3Bi; 42:38 | 3Ae; 37:34 | 3Ca; 33:1 | 39:38 | — | — |
| 4j | 35 | 37:36 | 42:41 | 41:40 | 40:39 | 39:38 | 38:37 | 3Bj; 40:36 | 3Af; 35:34 | 3Ca; 33:1 | 37:36 | — | — |
| 4k | 36 | 35:34 | 40:39 | 39:38 | 38:37 | 37:36 | 36:35 | 3Bk; 38:34 | — | 3Ca; 33:1 | 35:34 | — | — |
| 4l | 37 | 33:32 | 38:37 | 37:36 | 36:35 | 35:34 | 34:33 | 3Bl; 36:32 | — | 3Cb; 31:1 | 33:32 | 31:30 | 29:28 |
| 4m | 40 | 31:30 | 36:35 | 35:34 | 34:33 | 33:32 | 32:31 | 3Bm; 34:30 | — | 3Cc; 29:1 | 31:30 | 29:28 | — |
| 4n | 41 | 29:28 | 34:33 | 33:32 | 32:31 | 31:30 | 30:29 | 3Bn; 32:28 | — | 3Cd; 27:1 | 29:28 | — | — |
| 4o | 34 | 27:26 | 32:31 | 31:30 | 30:29 | 29:28 | 28:27 | 3Bo; 30:26 | 3Ag; 25:5 | 3Ce; 4:1 | 27:26 | — | — |
| 4p | 34 | 25:24 | 30:29 | 29:28 | 28:27 | 27:26 | 26:25 | 3Bp; 28:24 | 3Ah; 23:5 | 3Ce; 4:1 | 25:24 | — | — |
| 4q | 35 | 23:22 | 28:27 | 27:26 | 26:25 | 25:24 | 24:23 | 3Bq; 26:22 | 3Ag; 21:5 | 3Ce; 4:1 | 23:22 | — | — |
| 4r | 35 | 21:20 | 26:25 | 25:24 | 24:23 | 23:22 | 22:21 | 3Br; 24:20 | 3Ah; 19:5 | 3Ce; 4:1 | 21:20 | — | — |
| 4s | 34 | 19:18 | 24:23 | 23:22 | 22:21 | 21:20 | 20:19 | 3Bs; 22:18 | 3Ai; 17:5 | 3Ce; 4:1 | 19:18 | — | — |
| 4t | 34 | 17:16 | 22:21 | 21:20 | 20:19 | 19:18 | 18:17 | 3Bt; 20:16 | 3Aj; 15:5 | 3Ce; 4:1 | 17:16 | — | — |
| 4u | 35 | 15:14 | 20:19 | 19:18 | 18:17 | 17:16 | 16:15 | 3Bu; 18:14 | 3Ai; 13:5 | 3Ce; 4:1 | 15:14 | — | — |

TABLE 13-continued

Level 4 Gates

| Gate | Fig | Output bits | Corresponding Medium Shift Output Bits According to Fine Shift Select | | | | | IB (med. shift top bits) prop info & source | IA (med. shift middle bits) prop info & source | IC (med. shift bottom bits) prop info & source | ID | IE | IF |
|---|---|---|---|---|---|---|---|---|---|---|---|---|---|
| | | | shift-0 | shift-1 | shift-2 | shift-3 | shift-4 | | | | | | |
| 4v | 35 | 13:12 | 18:17 | 17:16 | 16:15 | 15:14 | 14:13 | 3Bv; 16:12 | 3Aj; 11:5 | 3Ce; 4:1 | 13:12 | — | — |
| 4w | 38 | 11:10 | 16:15 | 15:14 | 14:13 | 13:12 | 12:11 | 3Bw; 14:10 | 3Ak; 9:5 | 3Ce; 4:1 | 11:10 | — | — |
| 4x | 38 | 9:8 | 14:13 | 13:12 | 12:11 | 11:10 | 10:9 | 3Bx; 12:8 | 3Al; 7:5 | 3Ce; 4:1 | 9:8 | — | — |
| 4y | 38 | 7:6 | 12:11 | 11:10 | 10:9 | 9:8 | 8:7 | 3By; 10:6 | 3Am; 5 | 3Ce; 4:1 | 7:6 | — | — |
| 4z | 39 | 5:4 | 10:9 | 9:8 | 8:7 | 7:6 | 6:5 | — | — | — | 5:4 | — | — |
| 4aa | 42 | 3:2 | 8:7 | 7:6 | 6:5 | 5:4 | 4:3 | — | — | — | 3:2 | — | — |
| 4bb | 43 | 1:0 | 6:5 | 5:4 | 4:3 | 3:2 | 2:1 | — | — | — | 1:0 | — | — |

In sum, the present invention comprises a method and apparatus that performs anticipatory rounding of intermediate results in a floating point arithmetic system while the intermediate results are being normalized. One embodiment of the present invention includes four logic levels, implemented in N-NARY logic. In the first logic level, coarse propagation information for preselected coarse propagation bit groups is encoded from the coarse shift output from the normalizer. In the second logic level, medium propagation information for preselected medium shift bit groups is derived by combining coarse propagation information for various bit groups from Level 1, selected according to the value of the medium shift select signal from the normalizer. In the third logic level, top bit, middle bit, and bottom bit propagation information is derived for preselected top groups, middle groups, and bottom groups of bit positions of the medium shift output, as a function of the value of the fine shift select signal. This information is derived by selectively combining propagation information from the second logic level with medium shift output bit values. In the fourth logic level, an incremented, normalized intermediate single-precision or double-precision mantissa result is produced by combining fine shift output bit values with propagation information for the appropriate top bit group, middle bit group, and bottom bit group.

Other embodiments of the invention will be apparent to those skilled in the art after considering this specification or practicing the disclosed invention. The specification and examples above are exemplary only, with the true scope of the invention being indicated by the following claims.

We claim:

1. A rounding anticipator that operates in parallel with the normalizer in a floating point arithmetic system that includes a normalizer with a coarse shifter having a coarse shift output, a medium shifter having a medium shift output and a medium shift select signal, and a fine shifter having a fine shift output and a fine shift select signal, comprising:

a first logic level, said first logic level accepts the coarse shift output from the normalizer and encodes coarse propagation information for a plurality of preselected coarse propagation bit groups;

a second logic level, said second logic level derives propagation information for preselected groups of bit positions of the medium shift output of the normalizer by selectively combining said coarse propagation information from coarse propagation bit groups selected according to the value of the medium shift select signal from the normalizer;

a third logic level, said third logic level derives top bit, middle bit, and bottom bit propagation information for a plurality of preselected top groups, middle groups, and bottom groups of bit positions of the medium shift output as a function of the value of the fine shift select signal by selectively combining said propagation information from said second logic level with medium shift output bit values; and a fourth logic level, said fourth logic level produces an incremented, normalized intermediate mantissa result by combining fine shift output bit values with said top bit propagation information, said middle bit propagation information, and said bottom bit propagation information for the top group of bit positions, the middle group of bit positions, and the bottom group of positions that correspond to said fine shift output bit values.

2. The rounding anticipator of claim 1, wherein said first logic level, said second logic level, said third logic level, and said fourth logic level are implemented in N-NARY logic.

3. The rounding anticipator of claim 2, wherein said incremented, normalized intermediate mantissa result is expressed in single precision format.

4. The rounding anticipator of claim 2, wherein said incremented, normalized intermediate mantissa result is expressed in double precision format.

5. A rounding anticipation system that operates in parallel with a normalizer in a floating point arithmetic system, where the normalizer includes a coarse shifter having a coarse shift output, a medium shifter having a medium shift output and a medium shift select signal, and a fine shifter having a fine shift output and a fine shift select signal, comprising:

a first logic level, said first logic level accepts the coarse shift output from the normalizer and encodes coarse propagation information for a plurality of preselected coarse propagation bit groups;

a second logic level, said second logic level derives propagation information for preselected groups of bit positions of the medium shift output of the normalizer by selectively combining said coarse propagation information from coarse propagation bit groups selected according to the value of the medium shift select signal from the normalizer;

a third logic level, said third logic level derives top bit, middle bit, and bottom bit propagation information for a plurality of preselected top groups, middle groups, and bottom groups of bit positions of the medium shift output as a function of the value of the fine shift select signal by selectively combining said propagation information from said second logic level with medium shift output bit values; and a fourth logic level, said fourth logic level produces an incremented, normalized intermediate mantissa result by combining fine shift output bit values with said top bit propagation information, said middle bit propagation information, and said bottom bit propagation information for the top group of bit positions, the middle group of bit positions, and the bottom group of positions that correspond to said fine shift output bit values.

6. The system of claim 5, wherein said first logic level, said second logic level, said third logic level, and said fourth logic level are implemented in N-NARY logic.

7. The system of claim 6, wherein said incremented, normalized intermediate mantissa result is expressed in single precision format.

8. The system of claim 6, wherein said incremented, normalized intermediate mantissa result is expressed in double precision format.

9. A method of incrementing an intermediate mantissa result while it is being normalized in a floating point arithmetic system that includes a normalizer with a coarse shifter having a coarse shift output, a medium shifter having a medium shift output and a medium shift select signal, and a fine shifter having a fine shift output and a fine shift select signal, comprising:

accepting the coarse shift output from the normalizer and encoding coarse propagation information for a plurality of preselected coarse propagation bit groups of said coarse shift output;

deriving medium propagation information for preselected groups of bit positions of the medium shift output of the normalizer by selectively combining said coarse propagation information from coarse propagation bit groups selected according to the value of the medium shift select signal from the normalizer;

deriving top bit, middle bit, and bottom bit propagation information for a plurality of preselected top groups, middle groups, and bottom groups of bit positions of the medium shift output as a function of the value of the fine shift select signal by selectively combining said medium propagation information with medium shift output bit values; and producing an incremented, normalized intermediate mantissa result by combining fine shift output bit values with said top bit propagation information, said middle bit propagation information, and said bottom bit propagation information for the top group of bit positions, the middle group of bit positions, and the bottom group of positions that correspond to said fine shift output bit values.

10. The method of claim 9, further comprising using N-NARY logic.

11. The method of claim 10, wherein said incremented, normalized intermediate mantissa result is expressed in single precision format.

12. The method of claim 10, wherein said incremented, normalized intermediate mantissa result is expressed in double precision format.

13. A method of making a rounding anticipator that operates in parallel with the normalizer in a floating point arithmetic system where the normalizer includes a coarse shifter having a coarse shift output, a medium shifter having a medium shift output and a medium shift select signal, and a fine shifter having a fine shift output and a fine shift select signal, comprising:

providing a first logic level that accepts the coarse shift output from the normalizer and encodes coarse propagation information for a plurality of preselected coarse propagation bit groups;

providing a second logic level that derives propagation information for preselected groups of bit positions of the medium shift output of the normalizer by selectively combining said coarse propagation information from coarse propagation bit groups selected according to the value of the medium shift select signal from the normalizer;

providing a third logic level that derives top bit, middle bit, and bottom bit propagation information for a plurality of preselected top groups, middle groups, and bottom groups of bit positions of the medium shift output as a function of the value of the fine shift select signal by selectively combining said propagation information from said second logic level with medium shift output bit values; and providing a fourth logic level, said fourth logic level produces an incremented, normalized intermediate mantissa result by combining fine shift output bit values with said top bit propagation information, said middle bit propagation information, and said bottom bit propagation information for the top group of bit positions, the middle group of bit positions, and the bottom group of positions that correspond to said fine shift output bit values.

14. The method of claim 13, wherein said first logic level, said second logic level, said third logic level, and said fourth logic level are implemented in N-NARY logic.

15. The method of claim 14, wherein said incremented, normalized intermediate mantissa result is expressed in single precision format.

16. The method of claim 14, wherein said incremented, normalized intermediate mantissa result is expressed in double precision format.

* * * * *